United States Patent
Odani et al.

(10) Patent No.: US 6,367,067 B1
(45) Date of Patent: Apr. 2, 2002

(54) PROGRAM CONVERSION APPARATUS FOR CONSTANT RECONSTRUCTING VLIW PROCESSOR

(75) Inventors: Kensuke Odani, Kyoto; Akira Tanaka, Yawata; Shuichi Takayama, Takarazuka; Ryoichiro Koshimura, Settsu, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/143,269

(22) Filed: Aug. 28, 1998

(30) Foreign Application Priority Data

Aug. 29, 1997 (JP) .............................................. 9-235144

(51) Int. Cl.[7] .................................................. G06F 9/45
(52) U.S. Cl. ....................... 717/6; 717/9; 717/5; 712/24
(58) Field of Search ................................. 395/706, 705, 395/709; 712/226, 215, 210, 213, 214, 24; 717/6, 5, 9

(56) References Cited

U.S. PATENT DOCUMENTS

| | | | | |
|---|---|---|---|---|
| 5,557,761 A | * | 9/1996 | Chan et al. ..................... | 717/9 |
| 5,600,810 A | * | 2/1997 | Ohkami ....................... | 712/226 |
| 5,805,850 A | * | 9/1998 | Luick .......................... | 712/215 |
| 5,826,054 A | * | 10/1998 | Jacobs et al. ............... | 712/213 |
| 5,867,711 A | * | 2/1999 | Subramanian et al. ......... | 717/9 |
| 5,878,267 A | * | 3/1999 | Hampapuram et al. ....... | 712/24 |
| 5,941,983 A | * | 8/1999 | Gupta et al. ................ | 712/214 |
| 5,951,674 A | * | 9/1999 | Moreno ...................... | 712/210 |

* cited by examiner

Primary Examiner—Kakali Chaki
Assistant Examiner—Hoang-Vu Antony Nguyen-Ba
(74) Attorney, Agent, or Firm—Price and Gess

(57) ABSTRACT

A program conversion apparatus includes: the constant division unit 12 for specifying instructions in the serial assembler code 42 that use large constants which cannot be arranged within the operation fields of object VLIWs and for dividing the specified instructions into divided constant use instructions for storing pieces of the large constants into the specialized constant buffer 107 of a VLIW processor and divided constant use instructions for performing operations using the stored constants; the dependence graph generation unit 20 for generating a dependence graph based on the execution order of each instruction in the serial assembler code 42 after the division process by the constant division unit 12; and the instruction relocation unit 21 for relocating the instructions according to the dependence graph to generate parallel assembler code.

38 Claims, 20 Drawing Sheets

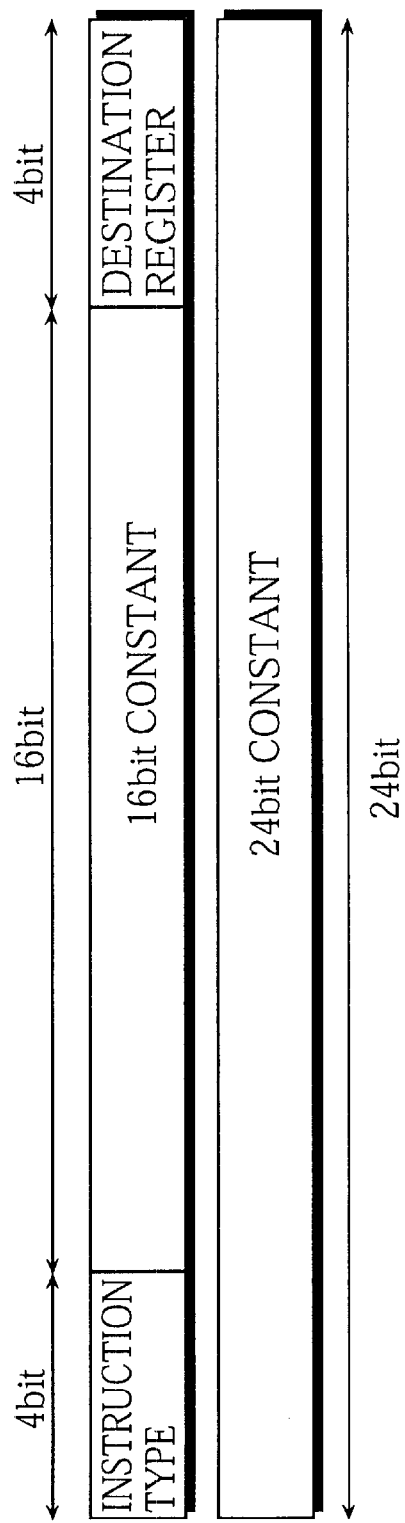

Fig. 11A

| NUMBER | INSTRUCTION |
|---|---|
| 400 | mov R0, R1 |
| 401 | add R1, R2 |
| 402 | Ld (LabeL), R3 |

Fig. 11B

| NUMBER | INSTRUCTION |
|---|---|
| 403 | mov R0, R1 |
| 404 | add R1, R2 |
| 405 | sfst LabeL : 12u |
| 406 | Ld (LabeL : 4L), R3 |

Fig. 11C

| NUMBER | VL1W |
|---|---|
| 407 | mov R0, R1;sfst LabeL : 12u |
| 408 | add R1, R2;Ld (LabeL : 4L), R3 |

Fig. 15

| NUMBER | VL1W |
|---|---|
| 930 | mov R0, R1 ; nop |
| 931 | add R1, R2 ; nop |
| 932 | Ld (LabeL), R3 |

Fig. 16

| NUMBER | VL1W |
|---|---|
| 940 | nop ; mov R0, R1 ; nop |
| 941 | nop ; mov R1, R2 ; mov R1, R3 |
| 942 | caLL _func ; nop |

Fig. 17A

| NUMBER | INSTRUCTION | ADDITIONAL INFORMATION |
|---|---|---|
| 410 | mov   R0 , R1 | @ID100 |
| 411 | add   R1 , R2 | @ID101 |
| 412 | Ld    (LabeL) , R3 | @ID102 |
| 413 | add   R2 , R4 | @ID103 |
| 414 | LaveL DS 4 | |

Fig. 17B

| NUMBER | INSTRUCTION | ADDITIONAL INFORMATION |
|---|---|---|
| 415 | mov   R0, R1 | @ID100 |
| 416 | add   R1, R2 | @ID101 |
| 417 | sfst  LabeL:12u | @ID102. LbU12. S16. M |
| 418 | Ld    (LabeL:4L), R3 | @ID102. LbL4. S16 |
| 419 | add   R2, R4 | @ID103 |
| 420 | LabeL DS 4 | |

Fig. 17C

| NUMBER | INSTRUCTION | ADDITIONAL INFORMATION | INSTRUCTION | ADDITIONAL INFORMATION |
|---|---|---|---|---|
| 421 | mov   R0, R1 | @ID100 | sfst LabeL :12u | @ID102. LbU12. S16. M |
| 422 | add   R1, R2 | @ID101 | Ld   (LabeL:4L), R3 | @ID102. LbL4. S16 |
| 423 | add   R2, R4 | @ID103 | nop | |
| 424 | LabeL DS 4 | | | |

Fig. 17D

| NUMBER | LOCATION INFORMATION | VL1W |
|---|---|---|
| 425 | 0x1000 | mov  R0, R1; sfst LabeL :12u |
| 426 | 0x1004 | add  R1, R2; Ld   (LabeL:4L) , R3 |
| 427 | 0x1008 | add  R2, R4; nop |
| 428 | 0x2000 | LabeL DS 4 |

Fig. 17E

| NUMBER | LABEL | LOCATION INFORMATION | ADDITIONAL INFORMATION |
|---|---|---|---|
| 429 | LabeL | 0x1000.3 | ID102. LbU12. S16. M |
| 430 | LabeL | 0x1004.3 | ID102. LbL4. S16 |

Fig. 17F

| NUMBER | ADDRESS | VL1W |
|---|---|---|
| 431 | 0x1001000 | nop              ; sfst LabeL:12u |
| 432 | 0x1001004 | mov   R0, R1; sfst LabeL:12m |
| 433 | 0x1001008 | add   R1, R2; Ld   (LabeL:4L), R3 |
| 434 | 0x1001012 | add   R2, R4; nop |
| 435 | 0x1002000 | LabeL DS 4 |

Fig. 17G

| NUMBER | LABEL | SIZE | INSTRUCTION IDENTIFIER |
|---|---|---|---|
| 436 | LabeL | 28 | @ID102 |

Fig. 18A

| NUMBER | INSTRUCTION | ADDITIONAL INFORMATION |
|---|---|---|
| 440 | mov R0, R1 | @ID100 |
| 441 | add R1, R2 | @ID101 |
| 442 | sfst LabeL:12u | @ID102. LbU12. S28. M |
| 443 | sfst LabeL:12m | @ID102. LbM12. S28 |
| 444 | Ld (LabeL:4L), R3 | @ID102. LbL4. S28 |
| 445 | add R2, R4 | |
| 446 | LabeL DS 4 | |

Fig. 18B

| NUMBER | INSTRUCTION | ADDITIONAL INFORMATION | INSTRUCTION | ADDITIONAL INFORMATION |
|---|---|---|---|---|
| 447 | mov R0, R1 | @ID100 | sfst LabeL :12u | @ID102. LbU12. S28. M |
| 448 | add R1, R2 | @ID101 | sfst LabeL :12m | @ID102. LbM12. S28 |
| 449 | add R2, R4 | @ID105 | Ld (LabeL:4L), R3 | @ID102. LbL4. S28 |
| 450 | LabeL DS 4 | | | |

Fig. 18C

| NUMBER | LOCATION INFORMATION | VLIW |
|---|---|---|
| 451 | 0x1000 | mov R0, R1; sfst LabeL :12u |
| 452 | 0x1004 | add R1, R2; sfst LabeL :12m |
| 453 | 0x1008 | add R2, R4; Ld (LabeL:4L) , R3 |
| 454 | 0x2000 | LabeL DS 4 |

Fig. 18D

| NUMBER | LABEL | LOCATION INFORMATION | ADDITIONAL INFORMATION |
|---|---|---|---|
| 455 | LabeL | 0x1000.3 | ID102. LbU12. S28. M |
| 456 | LabeL | 0x1004.3 | ID102. LbM12. S28 |
| 457 | LabeL | 0x1008.3 | ID102. LbL4. S28 |

Fig. 18E

| NUMBER | ADDRESS | VLIW |
|---|---|---|
| 458 | 0x1001000 | mov R0, R1; sfst LabeL:12u |
| 459 | 0x1001004 | add R1, R2; sfst LabeL:12m |
| 460 | 0x1001008 | add R2, R4; Ld (LabeL:4L), R3 |
| 461 | 0x1002000 | LabeL DS 4 |

| NUMBER | INSTRUCTION |
|---|---|
| 470 | mov R0, R1 |
| 471 | mov R1, R2 |
| 472 | mov R1, R3 |
| 473 | caLL _func |

| NUMBER | INSTRUCTION |
|---|---|
| 474 | mov R0, R1 |
| 475 | mov R1, R2 |
| 476 | mov R1, R3 |
| 477 | sfst _func |
| 478 | caLL |

| CYCLE | OUTPUTABLE INSTRUCTION GROUP | OUTPUT SCHEDULE INSTRUCTION GROUP |
|---|---|---|
| 1 | mov R0, R1<br>sfst _func<br>caLL | mov R0, R1<br>sfst _func |
| 2 | mov R1, R2<br>mov R1, R3<br>caLL | mov R1, R2<br>mov R1, R3<br>caLL |

| NUMBER | VL1W |
|---|---|
| 480 | nop ; mov R0, R1 ; sfst _func |
| 481 | caLL; mov R1, R2 ; mov R1, R3 |

Fig. 20A

| NUMBER | INSTRUCTION |
|---|---|
| 500 | mov R0, R2 |
| 501 | mov R1, R3 |
| 502 | add R3, R0 |
| 503 | caLL _func |

Fig. 20B

| NUMBER | INSTRUCTION |
|---|---|
| 504 | mov R0, R2 |
| 505 | mov R1, R3 |
| 506 | add R3, R0 |
| 507 | sfst _func |
| 508 | caLL |

Fig. 20C

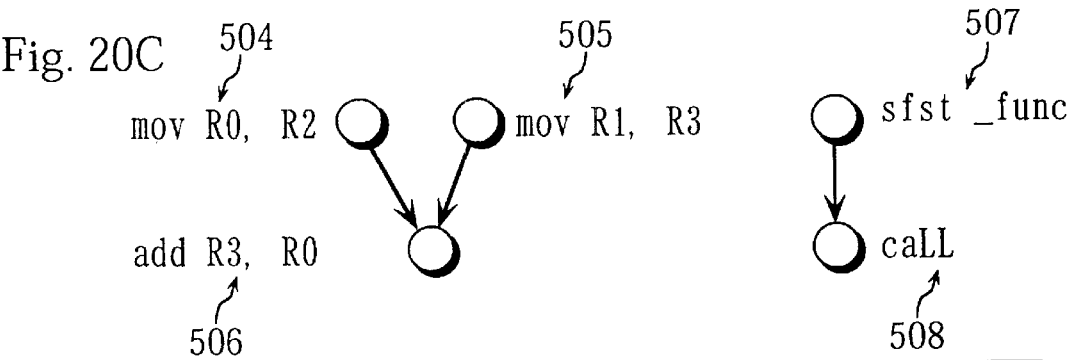

Fig. 20D

| CYCLE | OUTPUTABLE INSTRUCTION GROUP | OUTPUT SCHEDULE INSTRUCTION GROUP |
|---|---|---|
| 1 | mov R0, R2<br>mov R1, R3<br>sfst _func<br>caLL | mov R0, R2<br>mov R1, R3 |
| 2 | add R3, R0<br>sfst _func<br>caLL | sfst _func<br>add R3, R0<br>caLL |

Fig. 20E

| NUMBER | VL1W |
|---|---|
| 509 | nop ; mov R0, R2 ; mov R1, R3 |
| 510 | caLL; sfst _func ; add R3, R0 |

Fig. 20F

| NUMBER | VL1W |
|---|---|
| 511 | nop ; mov R0, R2 ; mov R1, R3 |
| 512 | caLL _func    ; add R3, R0 |

PROGRAM CONVERSION APPARATUS FOR CONSTANT RECONSTRUCTING VLIW PROCESSOR

This application is based on application No. H9-235144 filed in Japan, the content of which is hereby incorporated by reference.

BACKGROUND OF THE INVENTION

1. Field of the Invention

The present invention relates to a program conversion apparatus for generating executable code for a VLIW processor by translating, linking, and editing a source program written in a high-level language and a recording medium. In particular, the invention relates to a technique for dividing instructions including constants in a source program into parts and executing parallel scheduling with the divided instructions.

2. Related Art

VLIW (Very Long Instruction Word) processors include a plurality of operation units which execute a plurality of operations arranged in each VLIW in parallel. VLIWs are generated by program conversion apparatuses, namely compilers, which detect parallelism in source programs at an operation level and perform scheduling of the source programs.

VLIWs are, however, fixed-length instructions and therefore are inefficient as code. That is, in many cases, it is necessary to insert redundant codes, such as no-operation codes ("nop" codes), into VLIWs. VLIW processors avoiding the occurrence of redundant areas in VLIWs are disclosed by Japanese Patent Applications H09-159058 and H9-159059 of the same applicant as this application.

Each of these VLIW processors includes a specialized constant buffer and a function for executing a program, in which a constant included in each instruction is extracted as it is or is extracted and is divided into several partial digits, and is arranged in different VLIWs. In this specification, the term "divided constants" describes these divided parts of a constant, or on occasion, entire constants. Each VLIW processor executes this program by accumulating divided constants in the constant buffer (in a digit direction) to reconstruct the original constant and using the reconstructed original constant as a branch destination or an operand. Note that a VLIW processor having this function is hereinafter referred to as a "constant reconstructing VLIW processor". A compiler for the constant reconstructing VLIW processor divides long constants in a program into divided constants and fills redundant areas in instructions with the divided constants, thereby improving the code efficiency of the program.

However, a compiler has not yet been proposed which is suitable for the constant reconstructing VLIW processor. This compiler needs to divide long constants in a program into divided constants and to appropriately arrange the divided constants in a plurality of VLIWs. By doing so, the compiler generates executable code. This reduces redundant areas in instructions. This function needs to ensure that each original constant is correctly reconstructed from the divided constants arranged in the plurality of VLIWs and is definitely used by the intended instruction.

SUMMARY OF THE INVENTION

In view of the stated problems, the object of the present invention is to provide a compiler used for constant reconstructing VLIW processors and to provide executable code suitable for the constant reconstructing VLIW processors.

To achieve the above object, the compiler of the present invention converts an instruction sequence composed of serially arranged instructions into a VLIW sequence for a processor. The compiler includes: a division step for dividing each instruction including a constant in the instruction sequence into a plurality of divided instructions; an analysis step for analyzing dependence relations between each instruction in the instruction sequence including divided instructions generated in the division step according to an execution order of each instruction in the instruction sequence; and a relocation step for relocating instructions in the instruction sequence in compliance with the analyzed dependence relations to generate VLIWs which are each composed of a plurality of instructions that are executable in parallel.

With the stated steps, each instruction including a constant in a source program is divided into at least two shorter instructions and parallel scheduling is performed using the shorter instructions so that a compiler suitable for the constant reconstructing VLIW processor can be realized. That is, the generation of redundant areas in VLIWs is suppressed.

Here, the division step may include: an instruction size judgement substep for performing an instruction size judgement as to whether a size of an instruction including a constant is equal to or smaller than a size of each unit operation field in a VLIW; and a division substep which, when the size of the instruction including the constant is judged to be greater than the size of each unit operation field, divides the instruction including the constant into a plurality of divided instructions whose sizes are each equal to or smaller than the size of each unit operation field.

With the stated steps, only instructions whose sizes are greater than operation fields of object VLIWs are divided and are subjected to the parallel scheduling. Therefore, even when a source program includes instructions whose sizes are irrelevant to operation fields of object VLIWs, the division process is performed only on instructions which should be divided, reducing the compiling time.

Here, in the division substep, the instruction including the constant may be divided into one or more instructions for storing the constant into a storage buffer of the processor and an instruction for using the stored constant.

With the stated process, all constants in instructions are stored in a constant buffer. As a result, instructions including constants do not need to include the constants as operands so that a compiler suitable for VLIWs having small operation fields for specifying only operation codes can be realized.

Here, in the division substep, the instruction including the constant may be divided into one or more instructions for respectively storing one or more divided constants into the storage buffer of the processor and an instruction for using the stored divided constants, where the divided constants are obtained by dividing the constant.

With the stated process, only divided constants exceeding the size of constant areas in object VLIWs are pre-stored in the constant buffer and the following instructions use the divided constants in the constant buffer. As a result, a compiler suitable for VLIWs having operation fields for specifying short operands can be realized.

Here, the compiler may further include a combination step which, when two or more divided instructions generated from a same instruction including a constant in the division substep are arranged in a same VLIW in the relocation step, combines the two or more divided instructions into one instruction.

With the stated step, inconvenience situations can be precluded where an instruction which should remain as a single instruction (an instruction which should not be divided) are divided into two or more instructions, arranged in different operation fields of a VLIW, and are executed, so that the execution speed is reduced. Also, the combination of divided constant set instructions and inappropriate divided constant use instructions can be prevented.

Here, in the instruction size judgement substep, when the final size has not been determined, the instruction size judgement may be performed using an assumed size for the constant. The compiler may further include: a constant size determination step for linking a plurality of VLIW sequences and determining a final size of each constant; and an insertion step which, when the final size is greater than the assumed size, generates an instruction for storing into the storage buffer a divided constant corresponding to a difference between the final size and the assumed size and inserting the generated instruction into a corresponding VLIW sequence.

With the stated steps, inconsistency during the division and link processes due to label sizes which have not been determined during compiling and assembling can be avoided. Therefore, a compiler suitable for program development which links object modules generated in a plurality of compile units can be realized.

Here, in the instruction size judgement substep, when the final size has not been determined, the assumed size may be set to the maximum address size or constant size manageable by the processor or to the most commonly used address size or constant size.

With the stated process, inconstancy due to the assumed sizes can be avoided so that the generation of VLIWs including no-operation codes can be suppressed.

Here, the compiler may re-execute the division step after the constant size determination step, where in the instruction size judgement substep in the re-executed division step, the instruction size judgement is performed in consideration of the final size determined in the constant size determination step.

With the stated process, during the division of a constant, the final label size is taken into account so that the instruction insertion does not need to be performed and executable code where the code size and execution time are reduced can be generated.

Here, the compiler may re-execute the analysis step and the relocation step following the re-executed division step.

With the stated process, each constant is divided appropriately and the optimization by the parallel scheduling is repeated, so that executable code of higher code efficiency can be generated.

Here, the executable code of the present invention is a VLIW sequence for a processor which executes a plurality of instructions in parallel, where a VLIW in the VLIW sequence includes a constant to be stored into a storage buffer of the processor implicitly indicated by at least one VLIW in the VLIW sequence, and another VLIW, which follows the VLIW and is the first to refer to the storage buffer after the VLIW, includes an instruction for using the constant in the storage buffer.

In the stated code, each constant and each instruction using a constant are respectively divided into at least two shorter constants and instructions, are arranged in VLIWs, and are scheduled to be reconstructed by the constant reconstructing processor. Therefore, executable code suitable for the constant reconstructing VLIW processor, namely executable code of high code efficiency where the redundant areas in VLIWs are suppressed, can be provided.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 4A to 4B show two formats for 24-bit operation field of VLIWs;

FIGS. 11A to 11C show a series of input and output code and related data of Example 1;

FIG. 15 shows VLIWs generated by the instruction relocation unit 921 of the ordinary compiler;

FIGS. 16 shows parallel assembler code generated by the ordinary compiler;

FIGS. 17A to 17G show a series of input and output code and related data of Example 2;

FIGS. 18A to 18E show a series of input and output code and related data of Example 2 which are generated by each element of the compiler of the present invention when the generated location information 40 is again input into the constant division unit 12;

FIGS. 20A to 20F show a series of input and output code and related data of Example 4;

DESCRIPTION OF THE PREFERRED EMBODIMENTS

An embodiment of the compiler of the present invention is described below with reference to the figures.

<Hardware Requirement>

The present compiler is a cross compiler which translates and links a source program written in a high-level language to generate an executable program for a VLIW processor described later. The present compiler is achieved by a program which can be executed by a general computer system, namely an engineering work station or a personal computer. Therefore, the present compiler or code generated by the present compiler can be stored and distributed in a recording medium, such as a floppy disk, a CD-ROM, or a semiconductor memory.

It should be noted here that the "compiler" in this specification should not be interpreted as a narrow-sense compiler which generates assembler code by translating source code written in a high-level language, but should be interpreted as a broad-sense compiler which additionally has a function for generating machine-language object code by translating the assembler code and a function for linking the object code.

<Target processor>

Prior to the description of the present compiler, functions required by the target processor is described first.

(Architecture)

The target processor is a constant reconstructing VLIW processor described above.

Figure 1:
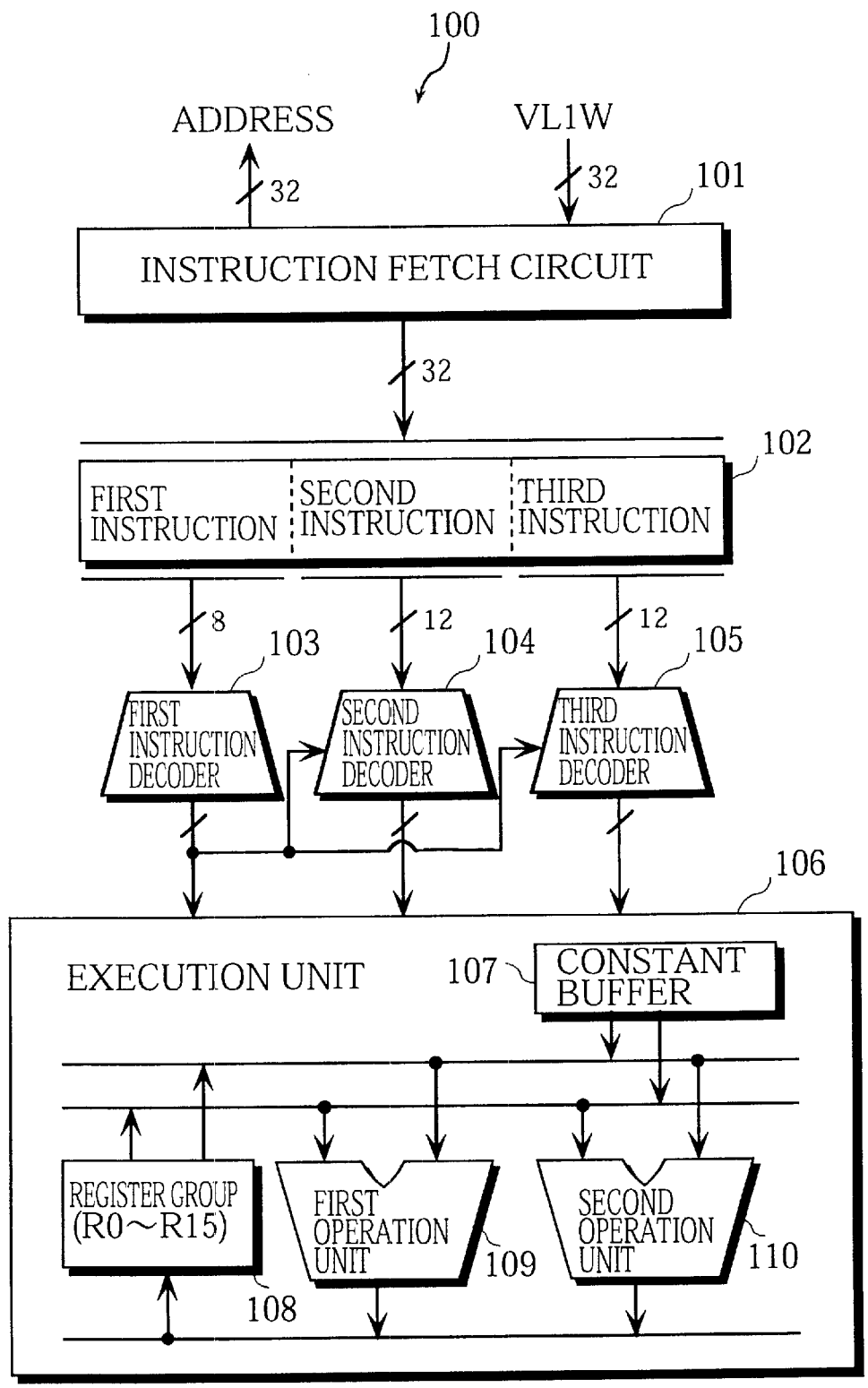
FIG. 1 is a block diagram showing an example of the architecture of the processor 100 for which the compiler of the present invention is used.

FIG. 1 is a block diagram showing an example architecture of the target processor.

The target processor 100 is a processor which executes fixed 32-bit VLIWs. The processor 100 includes the instruction fetch circuit 101, the instruction register 102, three instruction decoders 103–105, the constant buffer 107 which is a specialized shift register for accumulating constants up to 32 bits to reconstruct an original constant, the register group 108 including sixteen 32-bit registers R0–R15, and two operation units 109 and 110 which execute their operations in parallel.

In executing a program in which divided constants extracted from each original instruction are arranged in different VLIWs, the VLIW processor 100 has a function for accumulating the divided constants by shifting them in the constant buffer 107 to reconstruct the original constant. After the reconstruction, the VLIW processor 100 uses the reconstructed constant as a branch destination or an operand. Immediately after a value stored in the constant buffer 107 is used (referred to), the stored value is definitely cleared, that is, replaced by 0s to prepare for the next accumulation.

A compiler for the VLIW processor 100 needs to ensure that, during the execution of a program, all divided constants are definitely stored in the constant buffer 107 in appropriate order to reconstruct the original constant and that the reconstructed constant is definitely used by an intended instruction. That is, when dividing a constant in each instruction and arranging the divided constants in a plurality of VLIWs, the compiler needs to perform scheduling in view of various considerations, such as an execution order of the present instruction and other related instructions, to generate VLIWs, so that the original constant is definitely reconstructed from the divided constants and the reconstructed constant is used by the original instruction.

In this specification, a "VLIW" refers to code specifying a group of operations to be executed in one cycle in parallel by the VLIW processor 100, while an "instruction" (except for the "VLIW") refers to the code specifying a single operation. Also, a "constant" refers to a value explicitly specified in an instruction (an immediate) and to a label which is determined during a linkage.

Figures 2A, 2B:
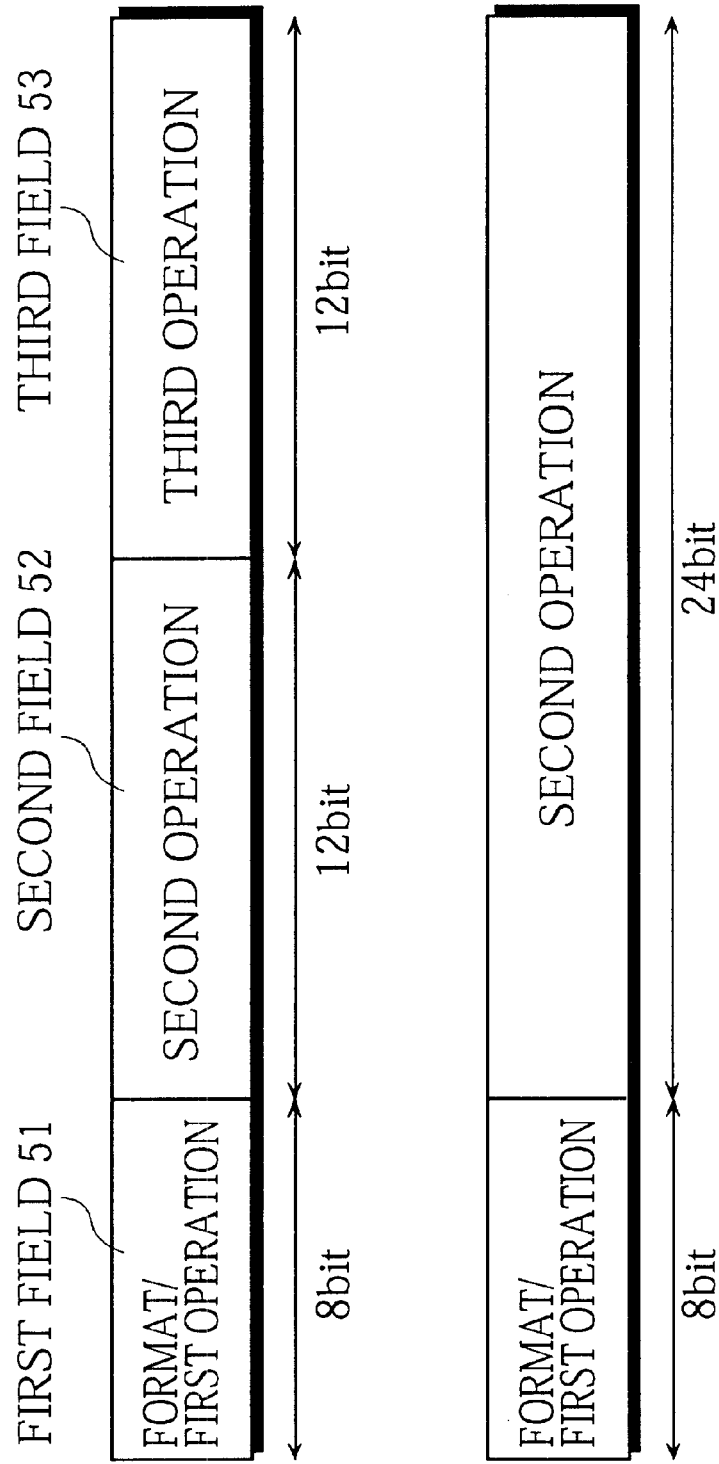
FIGS. 2A and 2B show two formats of VLIWs generated by the compiler of the present invention.

FIGS. 2A and 2B show two formats of VLIWs executed by the VLIW processor 100 (a three-operation format and a two-operation format).

Each VLIW is composed of three fields (the 8-bit first field 51, the 12-bit second field 52, and the 12-bit third field 53).

In the three-operation format shown in FIG. 2A, the first field 51 gives format information specifying a VLIW format and the first operation, the second field 52 gives the second operation, and the third field 53 gives the third operation.

In the two-operation format shown in FIG. 2B, the first field 51 gives the format information and the first operation and the 24-bit area composed of the second field 52 and the third field 53 gives the second operation.

The format information specifies one of the two formats and specifies one or more fields including only constants to be accumulated in the constant buffer 107 (the second field 52, the third field 53, or both the second and third fields 52 and 53).

The first operation is limited to a branch instruction. A branch label (a branch destination address) for the branch instruction is specified by the constant buffer 107, the second field 52, the third field 53, or a combination of such.

The second and third operations are standard transfer/arithmetic logic instructions that do not include branch instructions. Note that instructions requiring memory access, such as load or store instructions, are limited to either the second operation or the third operation. These standard transfer/arithmetic logic instructions are either 12 bits long or 24 bits long. Although basically expressed by 12 bits, the transfer/arithmetic logic instructions are expressed by 24 bits when long operands are included in the instructions.

Figures 3A, 3B, 3C:
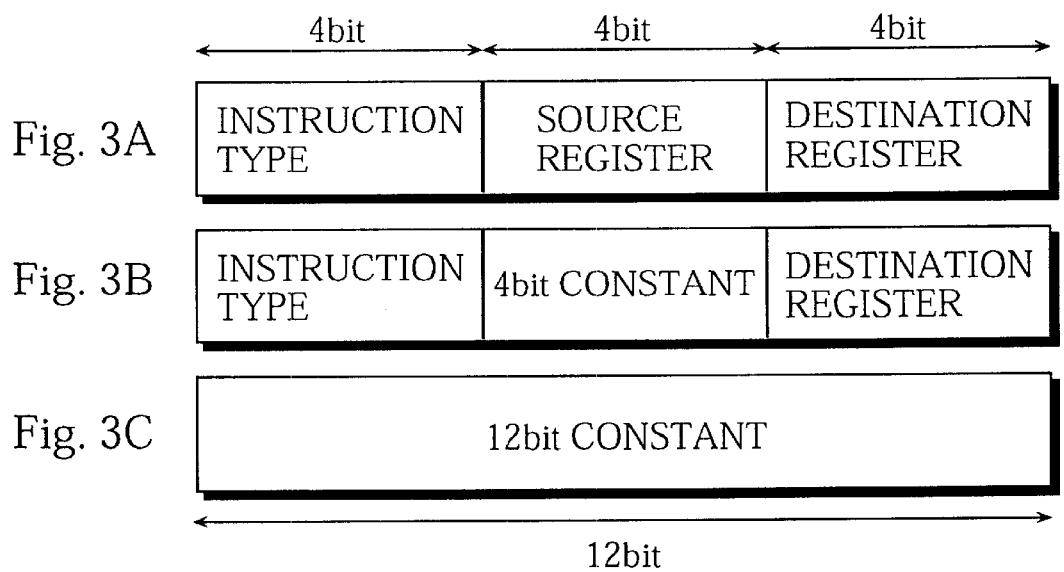
FIGS. 3A to 3C show three formats for 12-bit operation field of VLIWs.

FIGS. 3A to 3C show three formats for a 12-bit operation field. FIG. 3A shows a format for an interregister operation; FIG. 3B a format for an operation using a register and a 4-bit constant; FIG. 3C a format for only specifying a 12-bit divided constant to be stored in the constant buffer 107.

FIGS. 4A to 4B shows two formats for 24-bit operation field. FIG. 4A shows a format for an operation using a register and a 16-bit constant; FIG. 4B a format for only specifying a 24-bit divided constant to be stored in the constant buffer 107.

(Instruction Set)

The main instructions in the instruction set of the VLIW processor 100 are described below.

{(Example 1) mov 0x1234, R0}

This instruction is a transfer instruction for setting 16-bit constant "0x1234" (where 0x represents hexadecimal) in the register R0. This instruction is the same as for a standard processor.

This instruction includes a 16-bit constant. Accordingly, this instruction is used for a 24-bit operation. That means, another transfer/arithmetic logic instruction cannot be arranged in the VLIW that includes this instruction.

{(Example 2) sfst 0x1234:12u}This instruction is a transfer instruction for setting the upper 12 bits "0x1234: 12u" of the 16-bit constant "0x1234" in the constant buffer 107 by shifting the content in the constant buffer 107, and is a divided constant set instruction.

Here, the "divided constant set instruction" is an instruction for accumulating divided constants in an implicitly determined storage area (the constant buffer 107) and is an instruction unique to the VLIW processor 100. The divided constant can be all digits or partial digits of a branch label used for a branch operation or is partial digits of a constant used for a transfer/arithmetic logic instruction.

In the final executable code for this instruction, a field including this instruction includes only the 12-bit divided constant, making the instruction a 12-bit operation. The first field 51 includes format information specifying the instruction. Accordingly, the VLIW including this instruction can include only one more 12-bit operation.

{(Example 3) mov 0x1234:4L , R0}

This instruction is a divided constant use instruction. In more detail, it is a transfer instruction for setting a 16-bit constant in the register R0 by combining the divided constant stored in the constant buffer 107 as the upper 12 bits and the lower 4 bits of the constant "0x1234" specified by this instruction (0x1234:4L) as the lower 4 bits. Here, a "divided constant use instruction" is an instruction for using divided constants stored in an implicitly determined storage area (the constant buffer 107) and is an instruction unique to the VLIW processor 100.

The instruction of Example 3 is a 12-bit operation. Accordingly, a VLIW including this instruction can include only one more 12-bit operation.

It should be noted here that the execution result of the instruction of Example 1 is the same as that obtained by sequentially executing the instructions of Example 2 and Example 3. Accordingly, the compiler can generate two 12-bit instructions, namely the divided constant set instruction of Example 2 and the divided constant use instruction of Example 3, instead of the 24-bit instruction of Example 1. By doing so, when a redundant area is present in an instruction, the redundant area can be filled with the divided constant set instruction, thereby improving the code efficiency.

<Construction of Compiler>

Figure 5:
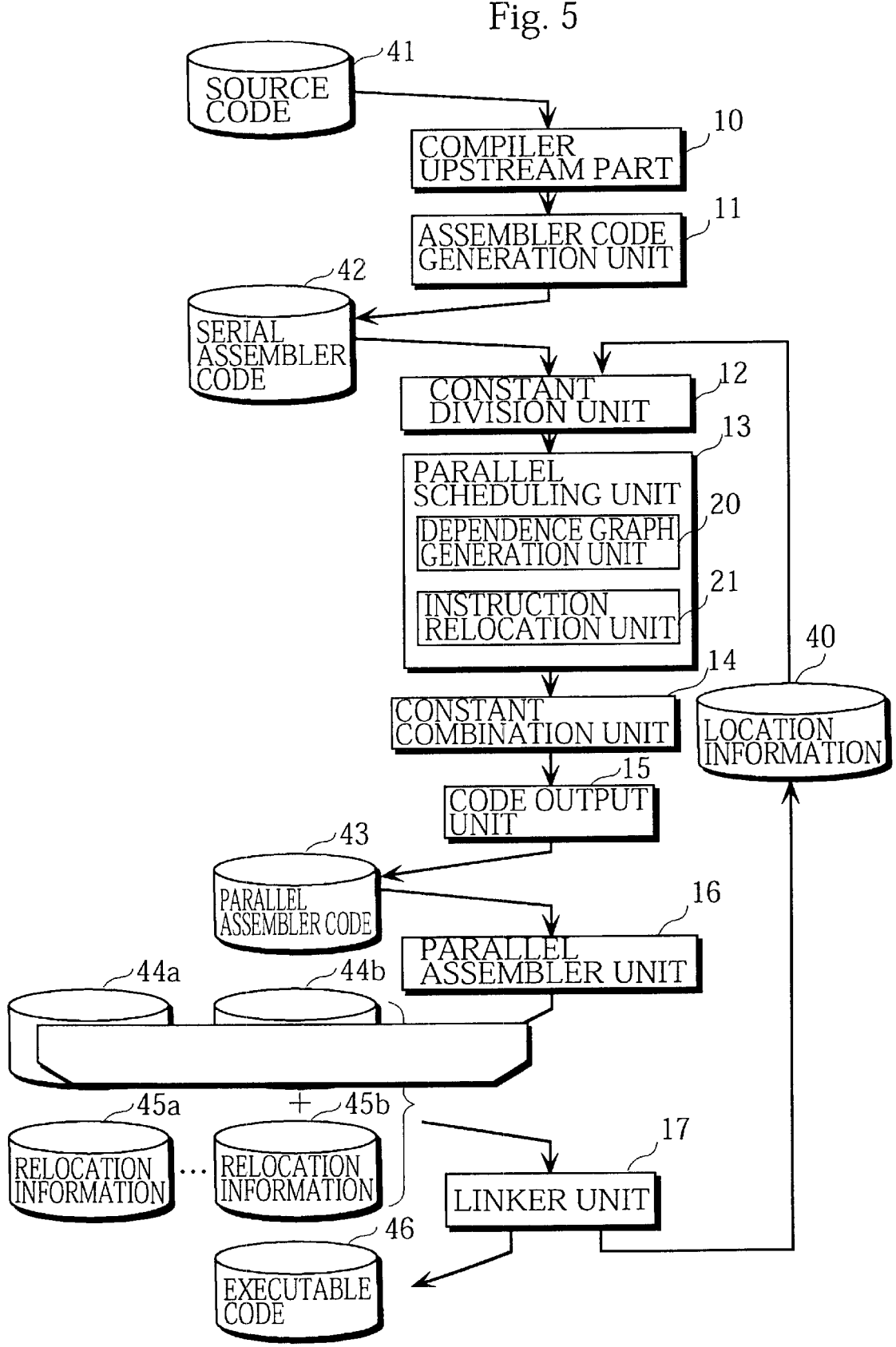
FIG. 5 is a block diagram showing the construction of the compiler and related input/output data.

FIG. 5 is a block diagram showing the construction of the present compiler and related input/output data.

The present compiler can be roughly divided into three groups. The first group generates the serial assembler code 42 from the source code 41 written in a high-level language (the compiler upstream part 10 and the assembler code generation unit 11). The second group generates the parallel assembler code 43 and the object code 44a–44b by subjecting the serial assembler code 42 to the parallel scheduling which is unique to the VLIW processor 100 (the constant division unit 12, the parallel scheduling unit 13, the constant combination unit 14, the code output unit 15, and the parallel assembler unit 16). The third group generates the final executable code 46 by linking a plurality of relocatable object code 44a and 44b (the linker unit 17).

The relocation information 45a–45b and location information 40 are related to labels and are input into or output from the linker unit 17. The relocation information 45a–45b and location information 40 are used to determine final label addresses and are also input into the constant division unit 12 for use when generating optimal code. The input/output data 40–45 and other intermediate language data are stored on a hard disk of the computer system described above as files or are stored in a memory as temporary data.

(Compiler Upstream Part 10)

The compiler upstream part 10 reads high-level language source code 41 saved in a file format, performs syntactic analysis and semantic analysis on the source code 41, and generates internal format code. Furthermore, as necessary, the internal format code are optimized so that the size of the finally generated executable code and the execution time are reduced. The processing of the compiler upstream part 10 is the same as that of the compiler upstream part of an ordinary compiler (a compiler for an ordinary processor, not for a constant reconstructing VLIW processor).

(Assembler Code Generation Unit 11)

The assembler code generation unit 11 generates the serial assembler code 42 from the internal format code which was generated and optimized by the compiler upstream part 10. Here, the "serial assembler code" is serially arranged assembler instructions for operations and is assembler code for an ordinary processor (a processor including one operation unit). The processing of the assembler code generation unit 11 is the same as that of the assembler code generation unit of an ordinary compiler.

(Constant Division Unit 12)

The constant division unit 12 reads the assembler code 42 generated by the assembler code generation unit 11 and divides all long constant use instructions included in the assembler code 42 into divided constant set instructions and divided constant use instructions. That is, long constant use instructions are replaced with two types of instructions (divided constant set instructions and divided constant use instructions). With the two types of instructions, the same process as that of a long constant use instruction is performed. During this replacement process, depending on the length of the long constant included in a long constant use instruction, the long constant use instruction may be replaced with two or more divided constant set instructions and a divided constant use instruction.

Here, a "long constant" is a constant which is too long to be written within a unit operation field in a VLIW. More specifically, (1) when used by a branch instruction, a long constant is a constant which cannot be written within the first operation field (a branch label expressed by one or more bits), and (2) when used by a transfer/arithmetic logic instruction, a long constant is a constant which cannot be written within a 12-bit operation field shown in FIG. 3B (a constant expressed by 5 or more bits). Also, a "long constant use instruction" is an instruction using a long constant.

On the other hand, a constant which can be written within a unit operation field in a VLIW, which is to say a constant used by a transfer/arithmetic logic instruction and is expressed by 4 or less bits, is called a "short constant". An instruction using a short constant is called a "short constant use instruction". Note that the divided constant use instruction includes a short constant (a constant of 4 or less bits) and therefore is a short constant use instruction.

The following is a detailed description of the processing of the constant division unit 12.

Figure 6:
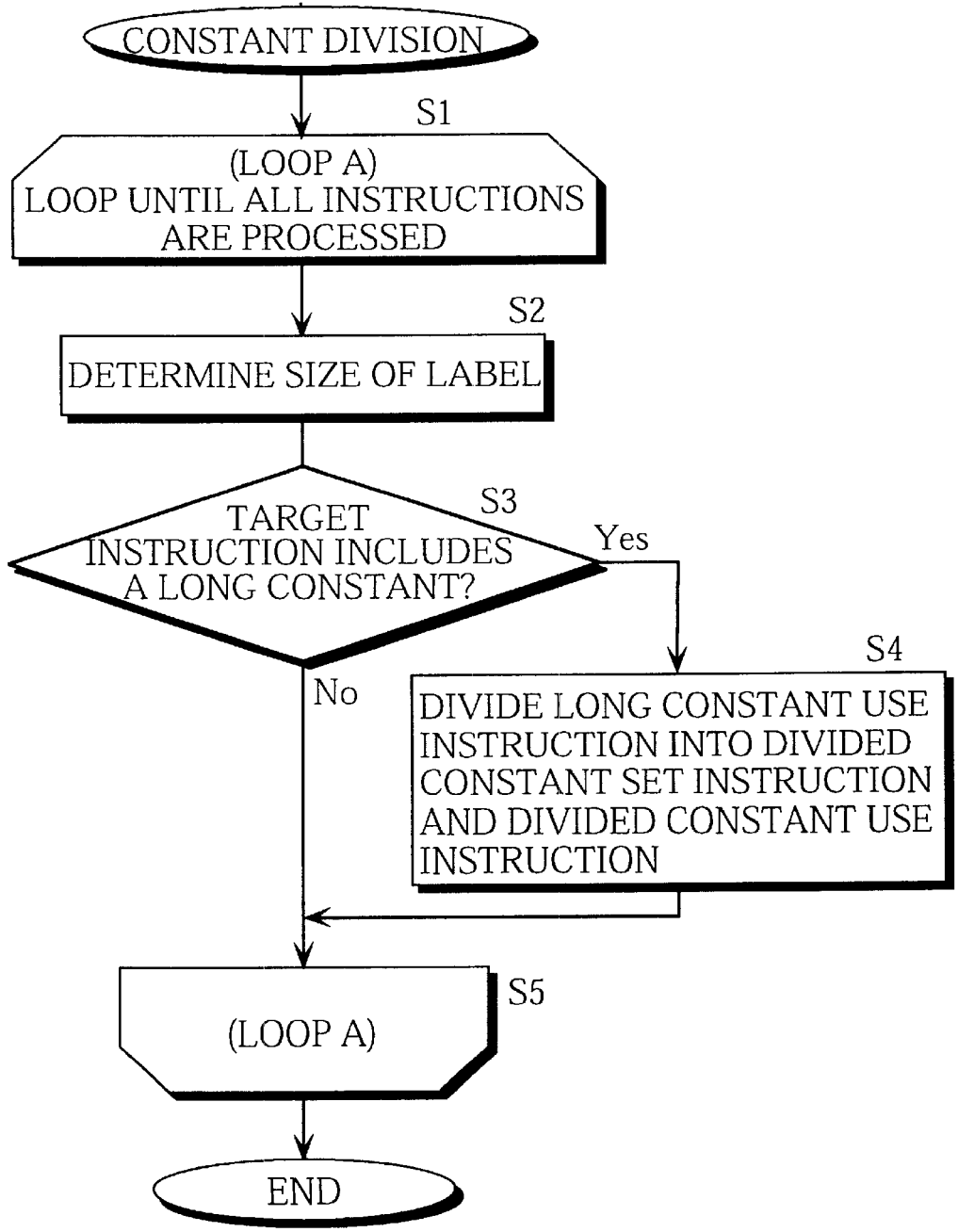
FIG. 6 is a flowchart showing the processing of the constant division unit 12 of the compiler of the present invention.

FIG. 6 is a flowchart showing the processing of the constant division unit 12.

The constant division unit 12 performs the following process (steps S2–S4) for each instruction included in the assembler code 42 (steps S1–S5).

Firstly, the constant division unit 12 determines the size of a label (the number of bits necessary to express an address indicated by the label) included in an instruction to be processed (hereinafter simply referred to as a "target instruction") (step S2).

More specifically, when the size of a label can be determined because the label is a local label which is present in the same compile unit of the source code 41 or when the size is explicitly indicated by any information such as the location information 40, the size is added to the label as size information as it is. When, however, the size of a label cannot be determined because the label is an external label which is present in another compile unit of the source code 41, a temporary size is added to the label as label information. Note that in this embodiment, the temporary size is predetermined to be 16 bits which, according to statistical analysis, is the most common address size.

The constant division unit 12 then determines whether the target instruction is a long constant use instruction (step S3).

When the target instruction is judged to be a long constant use instruction, the instruction is divided into one or more divided constant set instructions and a divided constant use instruction (step S4).

More specifically, when the long constant use instruction is a branch instruction, the long constant (an address indicated by a branch label) is divided into 12-bit parts in order from the least significant bit. The constant division unit 12 generates one or more divided constant set instructions, which set obtained divided constants in the constant buffer 107 sequentially from the most significant bit, and a divided constant use instruction (an instruction equivalent to the operation code of a branch instruction). The target instruction is replaced with the generated one or more divided constant set instructions and a divided constant use instruction. When the long constant in the instruction has 19 bits, for instance, the long constant is given leading zeros to be 24 bits (a multiple of 12 bits) and is divided into the upper 12 bits and the lower 12 bits. Three instructions in total, namely a divided constant set instruction for the upper 12-bit divided constant, a divided constant set instruction for the lower 12-bit divided constant, and a divided constant use instruction, are generated in this order. The target instruction is replaced with these generated instructions.

On the other hand, when the long constant use instruction is a transfer/arithmetic logic instruction, the constant division unit 12 first removes the equivalent of a short constant (the lower 4 bits) and divides the remaining long constant into 12-bit units starting from its least significant bit. The constant division unit 12 generates one or more divided constant set instructions, which set obtained divided constants in the constant buffer 107 sequentially from the most significant bit, and a divided constant use instruction (an instruction including the operation code of the transfer/arithmetic logic instruction and an operand indicating the short constant). The target instruction is replaced with the generated instructions. When the long constant in the instruction has 19 bits, for instance, the long constant is given leading zeros to be 28 bits (12 bits×n+4 bits) and is divided into the upper 12 bits, the middle 12 bits, and the lower 4 bits. Three instructions in total, namely a divided constant set instruction for the upper 12-bit divided constant, a divided constant set instruction for the middle 12-bit divided constant, and a divided constant use instruction including the lower 4-bit divided constant, are generated in this order. The target instruction is replaced with these generated instructions.

It should be noted here that two different methods of dividing a long constant are used depending on whether a long constant use instruction is a branch instruction or a transfer/arithmetic logic instruction. This is because a divided constant (a branch label) cannot be inserted into the first field 51 where a branch instruction is inserted, while a divided constant (a short constant) can be inserted into the second field 52 or the third field 53 where a transfer/arithmetic logic instruction is inserted.

(Parallel Scheduling Unit 13)

The parallel scheduling unit 13 receives serial assembler code from which long constant use instructions have been eliminated by the constant division unit 12. The parallel scheduling unit 13 detects the parallelism of the serial assembler code at the assembler instruction level and generates parallel assembler code packed into VLIWs corresponding to the three-operation format shown in FIG. 2A or the two-operation format shown in FIG. 2B. Here, "parallel assembler code" is assembler code for a VLIW processor, where a sequence of parallel assembler instructions is used to specify a plurality of operations that can be executed in parallel.

The parallel scheduling unit 13 includes the dependence graph generation unit 20 and the instruction relocation unit 21.

(Dependence Graph Generation Unit 20)

The dependence graph generation unit 20 generates a dependence graph for the assembler code output from the constant division unit 12. Here, the "dependence graph" is a directional graph expressing execution order relations between assembler instructions with links (also called arrows or edges) whose nodes are the instructions and regulates the execution order of instructions in the assembler code.

The processing of the dependence graph generation unit 20 is described in detail below.

Figure 7:
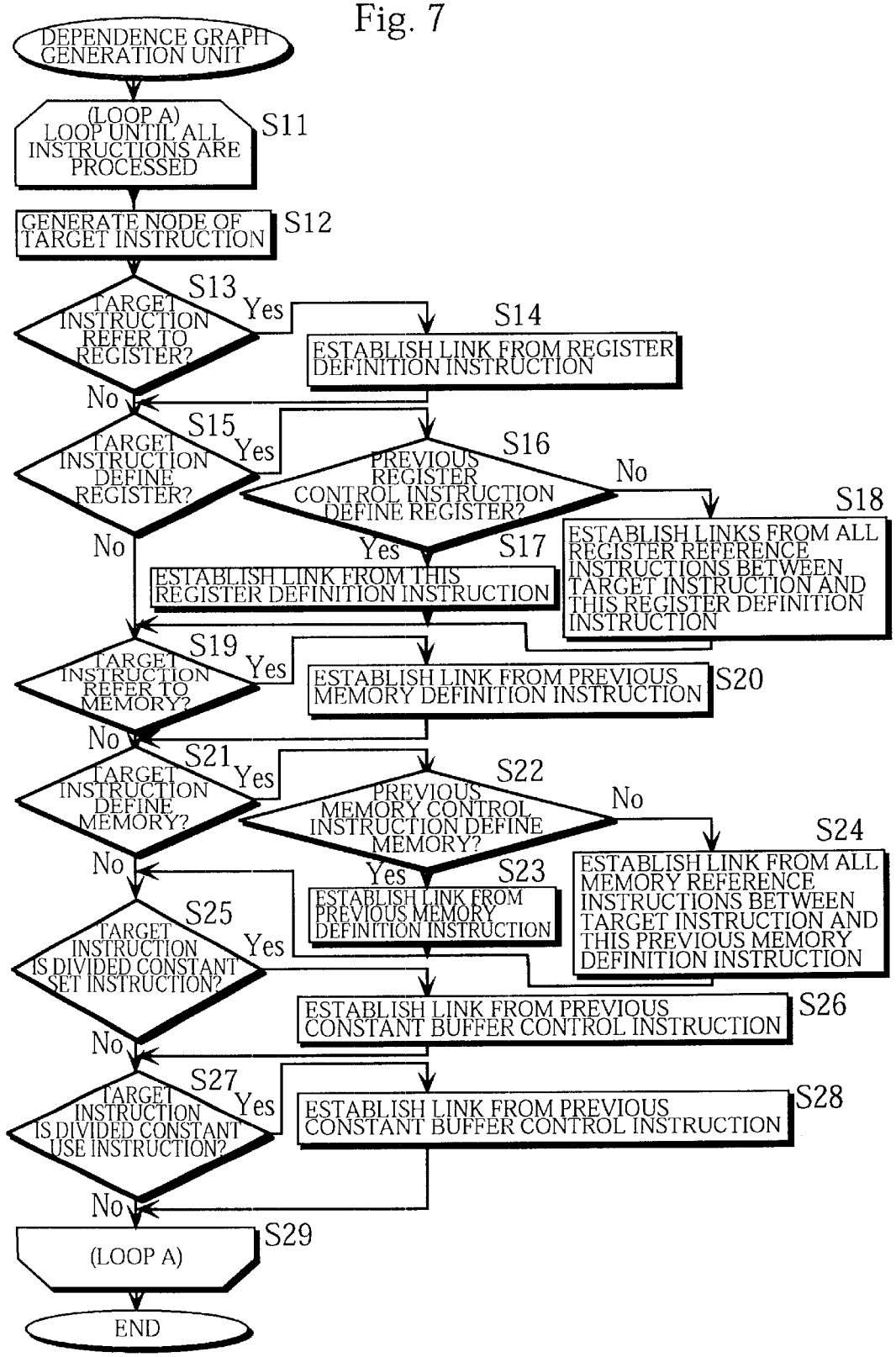
FIG. 7 is a flowchart showing the processing of the dependence graph generation unit 20 of the compiler of the present invention.

FIG. 7 is a flowchart showing the processing of the dependence graph generation unit 20.

The dependence graph generation unit 20 repeats the processing described below (steps S12–S27) for each instruction in the serial assembler code from which long constant use instructions are eliminated by the constant division unit 12 (steps S11–S29).

After generating the node of a target instruction (step S12), the dependence graph generation unit 20 repeats the following three processes, (1) the generation of a dependence graph based on the exclusive control over the register group 108 (steps S13–S18), (2) the generation of a dependence graph based on the exclusive control over the memory (steps S19–S24), and (3) the generation of a dependence graph based on the exclusive control over the constant buffer 107 (steps S25–S28). These processes are described in more detail below.

Firstly, the dependence graph generation unit 20 generates a node corresponding to a target instruction (step S12). More specifically, the dependence graph generation unit 20 generates information relating the target instruction to the node.

The dependence graph generation unit 20 judges whether the target instruction refers to a register (step S13). Here, "referring to a register" indicates that the value of the register is read.

When a register is referred to, the previous register definition instruction (a previous instruction which defines the register) is specified and a link from the specified instruction to the target instruction is established (step S14). More specifically, information indicating a link from the node corresponding to the indicated instruction to the node corresponding to the target instruction is generated.

In this specification, a "register definition" means that a value in a register is discarded and a new value is set in the register. Also, the "previous instruction" means the latest instruction before a target instruction.

When a single instruction refers to a plurality of registers, the dependence graph generation unit 20 repeats the steps S13 and S14 for each register. This repetition may also apply to the following steps.

Next, the dependence graph generation unit 20 judges whether the target instruction defines a register (step S15).

When the target instruction defines a register, the previous register control instruction (a previous instruction which controls the register) is specified and it is judged whether the specified instruction is a register definition instruction (step S16). Here, "register control" means the definition and reference of a register.

When the judgement result is that the specified instruction is a register definition instruction, a link from the register definition instruction to the target instruction is established (step S17).

On the other hand, when the specified instruction is a register reference instruction, not a register definition instruction, the previous register definition instruction is specified and links are established to the target instruction from each register reference instruction (instructions for referring to the register) located between the previous register definition instruction and the target instruction (step S18).

The processing related to register references and register definitions described above (steps S13–S18) is also performed for the memory (steps S19–S24).

Following this process, the dependence graph generation unit 20 judges whether the target instruction is a divided constant set instruction (step S25).

When the target instruction is a divided constant set instruction, a link from the previous constant buffer control instruction to the target instruction is established (step S26). Here, a "constant buffer control instruction" is an instruction for controlling (defining and referring to) the constant buffer 107, namely a divided constant set instruction and a divided constant use instruction.

Lastly, the dependence graph generation unit 20 judges whether the target instruction is a divided constant use instruction (step S27).

When the target instruction is a divided constant use instruction, a link from the previous constant buffer control instruction to the target instruction is established (step S28).

Note that there are differences between the process for generating a dependence graph concerning registers (steps S13–S18) and the process for generating a dependence graph concerning the constant buffer 107 (steps S25–S28). This is because each divided constant set instruction and divided constant use instructions that accesses the constant buffer 107 is an instruction for referring to and also defining the constant buffer 107. That is, the constant buffer 107 includes a shift register, so that a divided constant set instruction is a shift & set instruction (a reference and definition instruction). Because the content of the constant buffer 107 is cleared immediately after the content is referred to, a divided constant use instruction is a reference and definition instruction.

(Instruction Relocation Unit 21)

In compliance with the execution order indicated by the dependence graph generated by the dependence graph generation unit 20, the instruction relocation unit 21 relocates instructions in the serial assembler code output from the constant division unit 12 by packing the instructions in VLIW units of the target processor 100. When doing so, the instruction relocation unit 21 relocates instructions so that the largest possible number of instructions are executed in parallel, thereby reducing the execution time.

The processing of the instruction relocation unit 21 is described in detail below.

Figure 8:
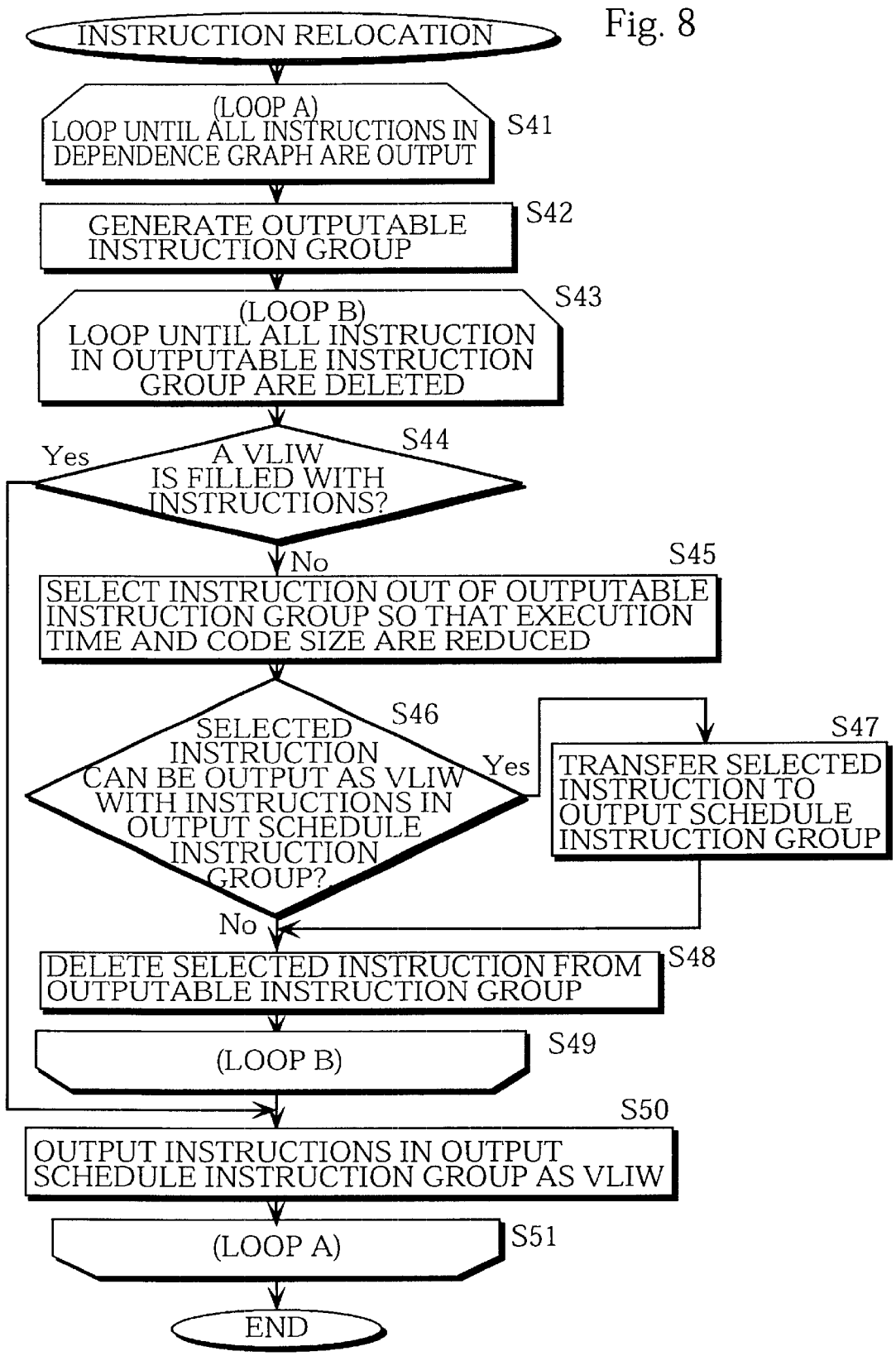
FIG. 8 is a flowchart showing a processing of the instruction relocation unit 21 of the compiler of the present invention.

FIG. 8 is a flowchart showing the processing of the instruction relocation unit 21.

The instruction relocation unit 21 repeats the following process (steps S42–S50) until all instructions in the serial assembler code are relocated (all instructions are packed in VLIW units and are output from the parallel scheduling unit 13) (steps S41–S51).

Firstly, the instruction relocation unit 21 checks the dependence graph to classify all instructions that can be output at the present time into an outputable instruction group (step S42). Here, an "outputable instruction" is an instruction which does not depend on a previous instruction and so can be executed (outputted) independently. The examples of outputable instructions are (1) a target instruction to which there is no link in the dependence graph and (2) a target instruction whose link source node corresponds to instructions having been output or to divided constant set instructions in the dependence graph.

Also, the "outputable instruction group" is composed of all instructions which can be output at the present time. As described above, the outputable instruction group includes target instructions whose link source is a divided constant set instruction. This is because even if a VLIW includes a divided constant set instruction and a divided constant use instruction, these instructions can be replaced with a single instruction by the constant combination unit 14 as described later, so that these instructions can be executed without causing any problems.

After an outputable instruction group is generated (step S42), a process for selecting and deleting one instruction from the group (steps S45–S48) is repeated until all instructions have been selected and deleted from the group (steps S43–S49).

Note that when one VLIW is generated, the process exits from the loop (steps S43–S49), generates another outputable instruction group (step S42), and repeats the same process (steps S45–S48) (steps S43–S49) . This is because by the time instructions composing the generated VLIW are deleted from the outputable instruction group, new outputable instructions may have been generated.

First, the instruction relocation unit 21 judges whether a VLIW can be made from instructions in an output schedule instruction group (whether any more instructions can be inserted into the VLIW) (step S44).

Here, "output schedule instructions" are instructions which can be included in a generated single VLIW and are executable in parallel, while the "output schedule instruction group" temporarily holds instructions to accumulate the maximum number of output schedule instructions (the maximum number of output schedule instructions which can be arranged in a VLIW). That is, only instructions shifted from the outputable instruction group to the output schedule instruction group are output from the parallel scheduling unit 13 as instructions which compose a generated VLIW.

When judging that a VLIW cannot be generated in step S44, the instruction relocation unit 21 selects an instruction from the outputable instruction group that will result in the execution time and the code size being reduced (step S45). More specifically, the instruction relocation unit 21 calculates estimates for the total number of VLIWs generated from a basic block by referring to the dependence graph and selects the instruction that results in the lowest estimate.

After this, the instruction relocation unit 21 judges whether the selected instruction (a target instruction) can be included in the output schedule instruction group (step S46). Here, if one or more instructions have been included in the output schedule instruction group by this time, the instruction relocation unit 21 judges whether the included instructions and the target instruction can compose a VLIW (whether a VLIW can be output) (step S46)

For instance, when there is a 12-bit instruction in the output schedule instruction group and the instruction selected in step S45 is 24 bits long, these instructions cannot compose a VLIW. Therefore, the instruction relocation unit 21 judges that these instructions cannot be output. When a divided constant set instruction of the link source of the current node has not been output and is not present in the output schedule instruction group, the instruction relocation unit 21 judges that instructions cannot be output. This prevents the generation of an erroneous code, where a divided constant use instruction is output without divided constant set instructions.

When the instruction relocation unit 21 judges that an instruction included in the output schedule instruction group and a target instruction can compose a VLIW in step S46, the target instruction is transferred from the outputable instruction group to the output schedule instruction group (steps S47 and S48).

On the other hand, when the instruction relocation unit 21 judges that an instruction included in the output schedule instruction group and a target instruction cannot compose a VLIW in step S46, the target instruction cannot be output at this time and so is eliminated from the outputable instruction group (step S48).

When the instruction relocation unit 21 judges that a VLIW can be made from instructions in the output schedule instruction group in step S44, the instructions are eliminated from the output schedule instruction group and are output as a VLIW (step S50). Note that when the process proceeds from step S49 to step S50, there are cases where all operation fields of a VLIW cannot be filled with instructions remaining in the output schedule instruction group. In this case, a VLIW whose blank operation fields are filled with no-operation instructions (nop) is output.

In this manner, the serial assembler code input into the parallel scheduling unit 13 is packed into VLIWs to generate parallel assembler code which is then output.

(Constant Combination Unit 14)

When one or more divided constant set instructions and a divided constant use instruction generated from the same long constant use instruction by the constant division unit 12 are packed into the same VLIW (in the same cycle) by the parallel scheduling unit 13, the constant combination unit 14 replaces these instructions with a long constant use instruction which it obtains by combining these instructions. Similarly, when a plurality of divided constant set instructions generated from the same long constant use instruction are packed into the same VLIW (in the same cycle), the constant combination unit 14 replaces these instructions with a divided constant set instruction which it obtains by combining these instructions. This corresponds to a case where the constant division unit 12 need not have divided a long constant (need not have arranged divided constants in a plurality of VLIWs).

(Code Output Unit 15)

The code output unit 15 converts internal-format assembler code that has been combined (replaced) by the constant combination unit 14 to a text-format assembler code, and outputs the converted code as files (the parallel assembler code 43).

(Parallel Assembler Unit 16)

The parallel assembler unit 16 converts the parallel assembler code 43 output from the code output unit 15 into a machine language dedicated to the VLIW processor 100 for which the present compiler is used, and generates the object code 44a–44b and the relocation information 45a–45b. During this process, the format information to be located in the first field 51 of a VLIW is determined. In the case of a VLIW including one or more divided constant set instructions, for instance, the parallel assembler unit 16 generates machine code for the fields having only a divided constant and the format information indicating the fields.

Each of the relocation information 45a–45b is composed of information indicating the name of a label for each object code 44a, the address of an instruction using the label, and the size of the label. This label size is the size determined by the constant division unit 12 (the label size determined in step S2 shown in FIG. 6), and is a temporary value (16 bits in the above example) in the case of an external label.

(Linker Unit 17)

The linker unit 17 links the plurality of relocatable object code 44a–44b generated in different compile units, determines undetermined labels included in the object code, and generates the executable code 46 and the relocation information 40 for the VLIW processor 100.

Figure 9:
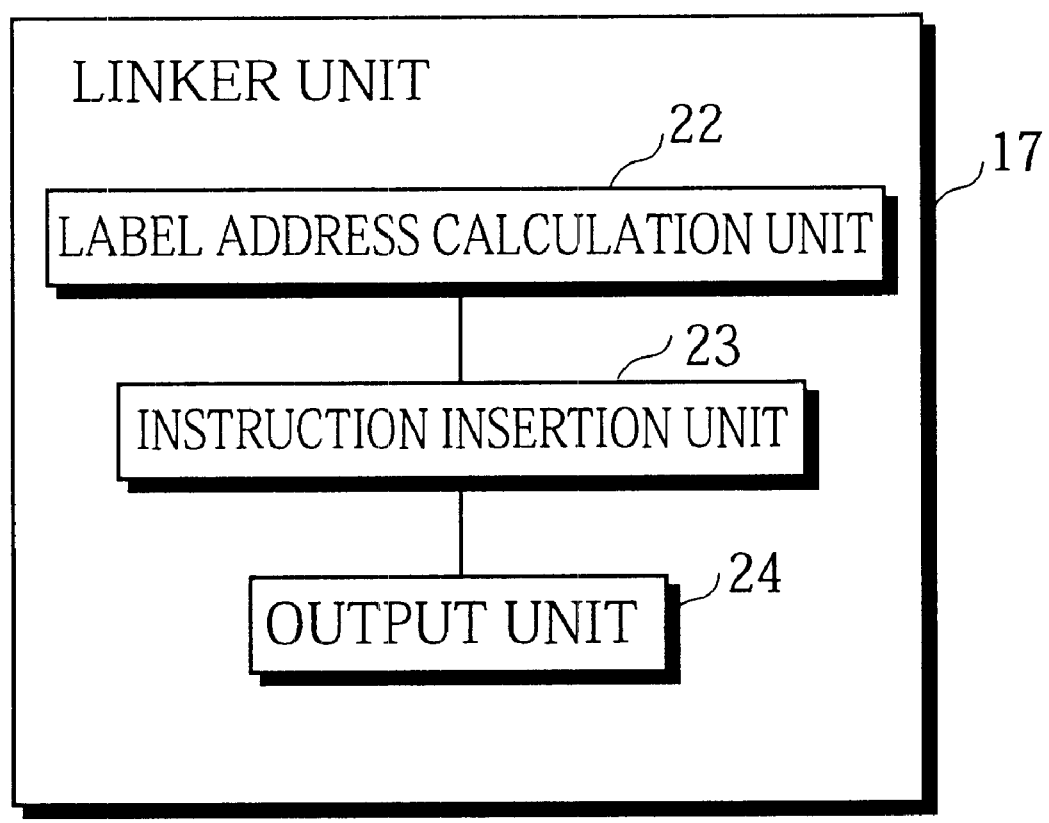
FIG. 9 is a block diagram showing the detailed construction of the linker unit 17 of the compiler of the present invention.

FIG. 9 is a block diagram showing the detailed construction of the linker unit 17.

The linker unit 17 includes the label address calculation unit 22, the instruction insertion unit 23, and the output unit 24.

The label address calculation unit 22 calculates an address of each label after the plurality of relocatable object code 44a–44b input into the linker unit is linked. By doing so, the size of each label is also determined. This process is the same as that by a label address calculation unit of an ordinary compiler.

When the size of a label calculated by the label address calculation unit 22 is greater than the size indicated by the relocation information 45a–45b, which is the size determined by the constant division unit 12, the instruction insertion unit 23 inserts the required divided constant set instruction to cope with the situation.

Figure 10:
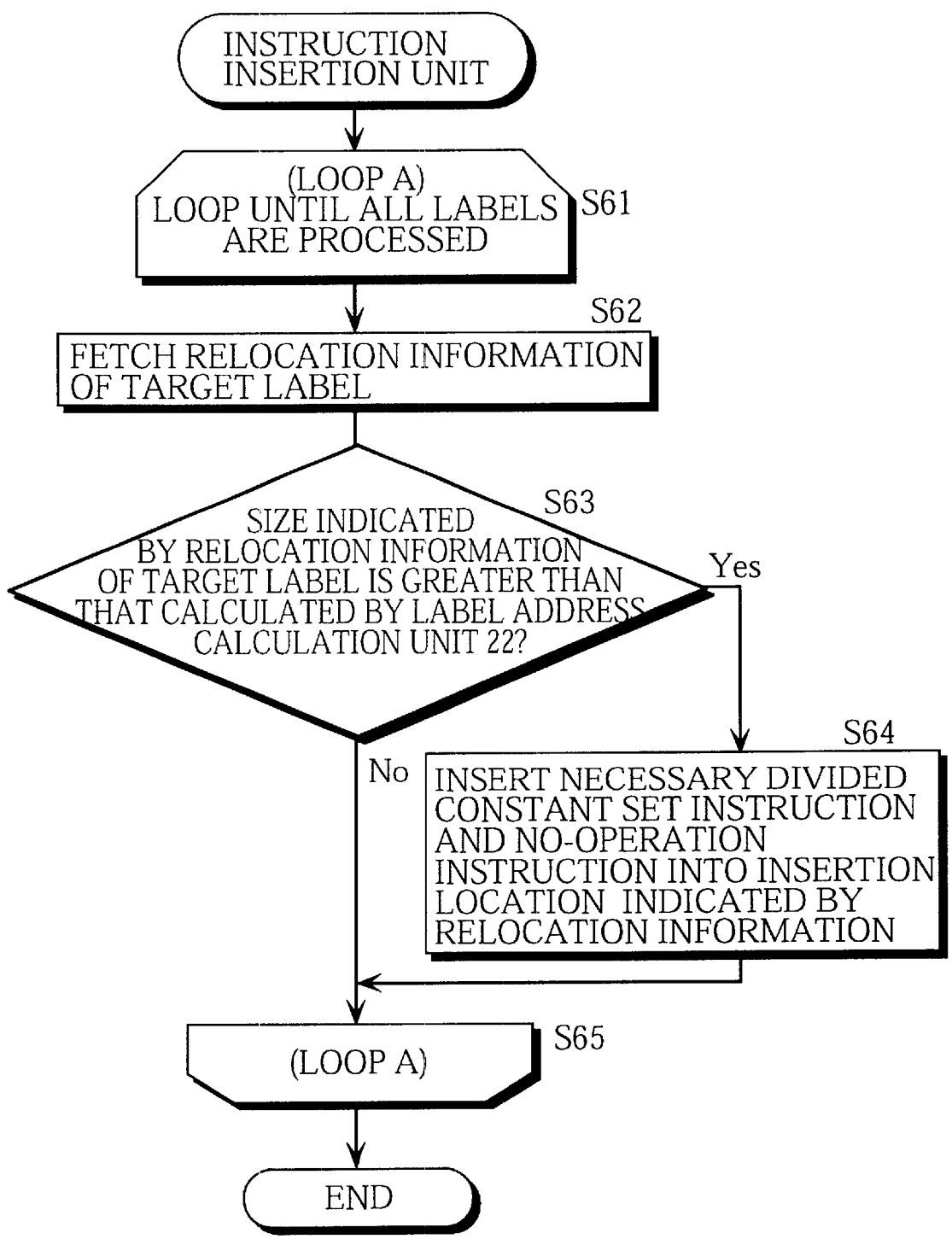
FIG. 10 is a flowchart showing the processing of the instruction insertion unit 23 of the linker unit 17.

FIG. 10 is a flowchart showing the processing of the instruction insertion unit 23.

The instruction insertion unit 23 sequentially fetches each label out of the object code 44a–44b input into the linker unit 17 and repeats the following process (steps S62–S64) for each of the fetched labels (steps S61–S65).

Firstly, relocation information of a fetched label (a target label) is read from the relocation information 45a–45b input into the linker unit 17 (step S62).

Then, the linker unit 17 judges whether the size calculated by the label address calculation unit 22 is greater than that of the target label indicated by the read relocation information (step S63).

If so, one or more divided constant set instructions are generated to store divided constants corresponding to the difference between these sizes. A new VLIW including the generated divided constant set instructions and a no-operation instruction is inserted immediately before the VLIW including the instruction that uses the target label (step S64).

By doing so, even if the size of a temporary label determined by the constant division unit 12 is smaller than the actually required size, the difference between these sizes is recognized and a necessary treatment is given.

The output unit 24 generates the location information 40 indicating the size of each label determined by the label address calculation unit 22 and a list of instructions that refer to the labels, and outputs the location information 40 with the executable code 46 obtained after the processing of the instruction insertion unit 23.

<Operation of the Compiler>

The following is a description of the operation of characteristic elements of the present compiler for specific instructions.

<Example 1>

The following description concerns an operation of the constant division unit 12 and the parallel schedule unit 13 where the serial assembler code 42 shown in FIG. 11A is generated by the assembler code generation unit 11 and is input into the constant division unit 12.

The assembler code 401 and 402 shown in FIG. 11A are described below.

{(Instruction 401) add R1, R2}

The value in the register R1 is added to the value in the register R2 and the result is stored in the register R2.

{(Instruction 402) Ld (LabeL), R3}

The value stored in the area with the memory address indicated by the label "LabeL" is loaded into the register R3.

(Constant Division Unit 12)

The operation of the constant division unit 12 when the serial assembler code 42 shown in FIG. 11A is input is described below with reference to the flowchart shown in FIG. 6.

The constant division unit 12 repeats the processing for dividing long constants (steps S1–S5) for each of three instructions shown in FIG. 11A. However, in this example, the instructions 400 and 401 include neither labels nor long constants and are therefore not processed.

The constant division unit 12 cannot determine the size of the label "LabeL" in the instruction 402 and so assumes the size is 16 bits (step S2).

Accordingly, the constant division unit 12 judges that the instruction 402 is a long constant use instruction (step S3) and replaces this long constant use instruction 402 with one or more divided constant set instructions and a divided constant use instruction (step S4).

FIG. 11B shows code generated by the constant division unit 12 when the serial assembler code 42 shown in FIG. 11A is input.

As shown in this figure, the long constant use instruction 402 in FIG. 11A is replaced with the divided constant set instruction 405 and the divided constant use instruction 406.

(Dependence Graph Generation Unit 20)

The following description is based on the assumption that the serial assembler code shown in FIG. 11B is input into the parallel scheduling unit 13. The operation of the dependence graph generation unit 20 in this case is described below with reference to the flowchart shown in FIG. 7.

The dependence graph generation unit 20 repeats the same process for each of three instructions shown in FIG. 11B (steps S11–S29).

Figure 12:
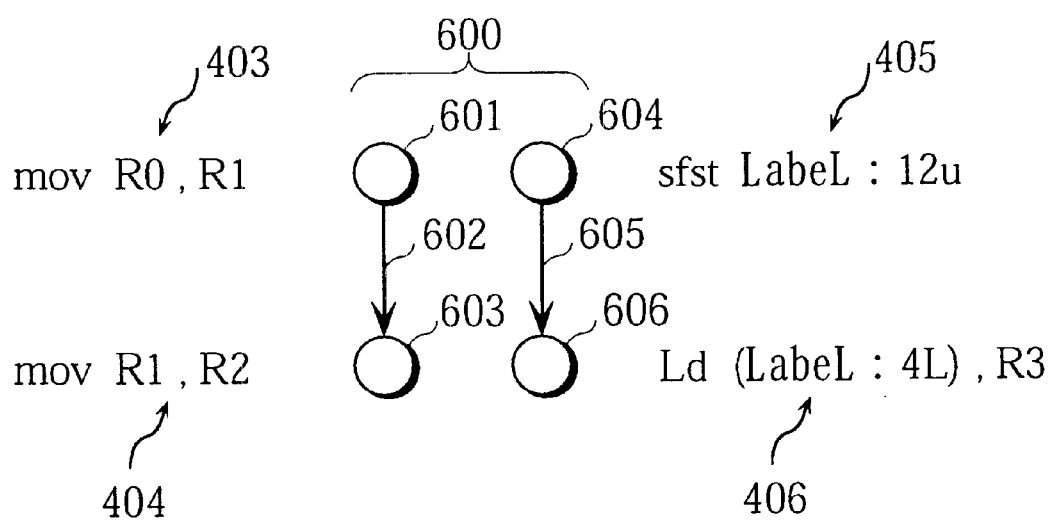
FIG. 12 is a final dependence graph generated by the dependence graph generation unit 20 when the serial assembler code shown in FIG. 11B is inputted into the parallel scheduling unit 13.

FIG. 12 shows the dependence graph 600 generated by the dependence graph generation unit 20 in the case where the serial assembler code shown in FIG. 11B is input into the parallel scheduling unit 13.

{(Instruction 403) mov R0, R1}

The dependence graph generation unit 20 generates the node 601 corresponding to this instruction 403 (step S12).

After this, because this instruction 403 refers to the register R0, a link from a previous instruction defining the register R0 should be established (steps S13 and S14). However, there are no preceding instructions, so that this link cannot be established.

Similarly, because this instruction 403 defines the register R1, a previous instruction controlling the register R1 should be specified (steps S15 and S16). However, there are no preceding instructions, so that a link cannot be established.

It should be noted here that this example uses only one basic block (a process routine having one entrance and one exit) for ease of explanation. However, when a dependence graph is generated for a program including a plurality of basic blocks, the plurality of basic blocks can be processed by using virtual nodes indicating preceding basic blocks and following basic blocks.

{(Instruction 404) add R1, R2}

The instruction 404 is to be processed next and so the dependence graph generation unit 20 generates node 603 corresponding to this instruction 404 (step S12).

Because the instruction 404 refers to the register R1, the dependence graph generation unit 20 specifies the previous instruction 403 defining the register R1 and establishes the link 602 from the instruction 403 to the instruction 404 (steps S13 and S14).

Because the instruction 404 defines the register R2, the previous instruction controlling the register R2 should be specified (steps S15 and S16). However, there is no such preceding instruction, so that a link is not established.

{(Instruction 405) sfst LabeL:12u}

The instruction 405 is to be processed next and so the dependence graph generation unit 20 generates the node 604 corresponding to this instruction 405 (step S12).

The instruction 405 does not control a register or memory and therefore is not subjected to the link process in steps S13–S24.

The instruction 405 is a divided constant set instruction, so that the dependence graph generation unit 20 attempts to specify a previous constant buffer control instruction (steps S25 and S26). However, there is no such preceding instruction, and therefore a link is not established.

{(Instruction 406) Ld (LabeL:4L), R3}

Finally, the instruction 406 is to be processed and the dependence graph generation unit 20 generates the node 606 corresponding to this instruction 406 (step S12).

Because the instruction 406 defines the register R3, the dependence graph generation unit 20 attempts to specify a previous instruction controlling the register R3 (steps S15 and S16). However, there is no such preceding instruction, and therefore a link is not established.

The instruction 406 is a divided constant use instruction so that the dependence graph generation unit 20 specifies the previous constant buffer control instruction 405 and establishes the link 605 from the instruction 405 to the instruction 406 (steps S27 and S28).

In this manner, the link 602 from the instruction 403 to the instruction 404 and the link 605 from the instruction 405 to the instruction 406 are established as shown in FIG. 12.

(Instruction Relocation unit 21)

In compliance with the execution order indicated by the dependence graph shown in FIG. 12, the instruction relocation unit 21 relocates the serial assembler code shown in FIG. 11B in parallel. The following is a description of the operation of the instruction relocation unit 21 in this case, with reference to the flowchart shown in FIG. 8.

Until all of the four instructions 403–406 shown in FIG. 11B are output, the instruction relocation unit 21 repeats the scheduling cycle (steps S41–S51) including a process for generating the outputable instruction group (step S42) and a process for consuming one instruction in the generated outputable instruction group at a time (step S43–S50).

(First Scheduling Cycle)

In the first scheduling cycle, the instruction relocation unit 21 generates a group composed of the three instructions 403, 405, and 406 as the outputable instruction group (step S42). This is because the instructions 403 and 405 are instructions without links from other nodes to their nodes, and the instruction 406 corresponds to a node whose link source node corresponds to a divided constant set instruction.

There is no instruction in the output schedule instruction group, so that the instruction relocation unit 21 judges that a VLIW cannot be made from instructions in the output schedule instruction group in step S44 and the process proceeds to the first consumption cycle by selecting an optimal instruction (step S45). In this example, the instruction 403 is selected.

Because the output schedule instruction group includes no instruction, the instruction relocation unit 21 moves the selected instruction 403 into the output schedule instruction group (step S47) and eliminates the instruction 403 from the outputable instruction group (step S48).

At this time, the instructions 405 and 406 remain in the outputable instruction group, so that the process proceeds to the second consumption cycle (steps S44–S48).

The output schedule instruction group does not include enough instructions to fill a VLIW at the present time, so that instruction relocation unit 21 judges that a VLIW cannot be made from instructions in the output schedule instruction group in step S44. In this example, the instruction relocation unit 21 selects the instruction 405 as an optimal instruction (step S45).

Both the selected instructions 405 and 403 in the output schedule instruction group are 12-bit instructions and so may construct a VLIW. Therefore, the instruction relocation unit 21 moves the instruction 405 into the output schedule instruction group (step S47) and eliminates the instruction 405 from the outputable instruction group (step S48).

At this time, only the instruction 406 remains in the outputable instruction group and the output schedule instruction group includes the instructions 403 and 405. As a result, the instruction relocation unit 21 judges that a VLIW can be made from instructions in the output schedule instruction group in step S44, eliminates these instructions 403 and 405 from the output schedule instruction group, and outputs a VLIW including these instructions (step S50).

When the instruction relocation unit 21 selects the instruction 406, instead of the instruction 405, as an optimal instruction in the second consumption cycle (step S45), the divided constant set instruction 405 from which a link is established to the node of the instruction 406 has not been output and is not included in the output schedule instruction group. Therefore, the instruction relocation unit 21 judges that an instruction included in the output schedule instruction group and a target instruction cannot compose a VLIW in step S46 and the instruction 406 is eliminated from the outputable instruction group. As a result, the same VLIW (the VLIW including the instructions 403 and 405) is output in this case.

FIG. 11C shows VLIWs (parallel assembler code) generated by the instruction relocation unit 21 when the serial assembler code shown in FIG. 11B is input into the parallel scheduling unit 13. Note that code in the first field 51 of a VLIW is omitted for ease of explanation.

The first scheduling cycle generates the VLIW 407 shown in FIG. 11C.

(Second Scheduling Cycle)

The second scheduling cycle starts with the instruction 406 remaining in the outputable instruction group.

The instruction relocation unit 21 newly adds the instruction 404 to the outputable instruction group (step S42). This is because the instruction 403 corresponds to the node from which a link is established to the node of the instruction 404. As a result, an outputable instruction group composed of the instructions 404 and 406 is generated.

There is no instruction in the output schedule instruction group so that the instruction relocation unit 21 judges that a VLIW cannot be made from instructions in the output schedule instruction group in step S44 and the process proceeds to the first consumption cycle by selecting an optimal instruction (step S45). In this example, the instruction relocation unit 21 selects the instruction 404.

There is no instruction in the output schedule instruction group in this case, so that the instruction relocation unit 21 moves the instruction 404 into the output schedule instruction group (step S47) and eliminates the instruction 404 from the outputable instruction group (step S48).

At this time, only the instruction 406 remains in the outputable instruction group. The process proceeds to the second consumption cycle in the same manner as the first scheduling cycle so that the instruction 406 is also transferred from the outputable instruction group to the output schedule instruction group (steps S44–S48).

The output schedule instruction group includes the instructions 404 and 406 at the present time, so that the instruction relocation unit 21 judges that a VLIW can be made from instructions in the output schedule instruction group in step S44. The instructions 404 and 406 are eliminated from the output schedule instruction group and are output as the second VLIW (step S50). That is, the second scheduling cycle generates the VLIW 408 shown in FIG. 11C.

By doing so, the instruction relocation unit 21 packs all instructions input into the parallel scheduling unit 13 in VLIWs which it then outputs (steps S41–S51). Then the instruction relocation unit 21 terminates its scheduling process.

(Comparison with Ordinary Compiler)

Two VLIWs shown in FIG. 11C are generated from the serial assembler code shown in FIG. 11A by the processing of the constant division unit 12 and the parallel scheduling unit 13. This process is compared with the case of an ordinary compiler to demonstrate the characteristics of the present compiler.

Figure 13:
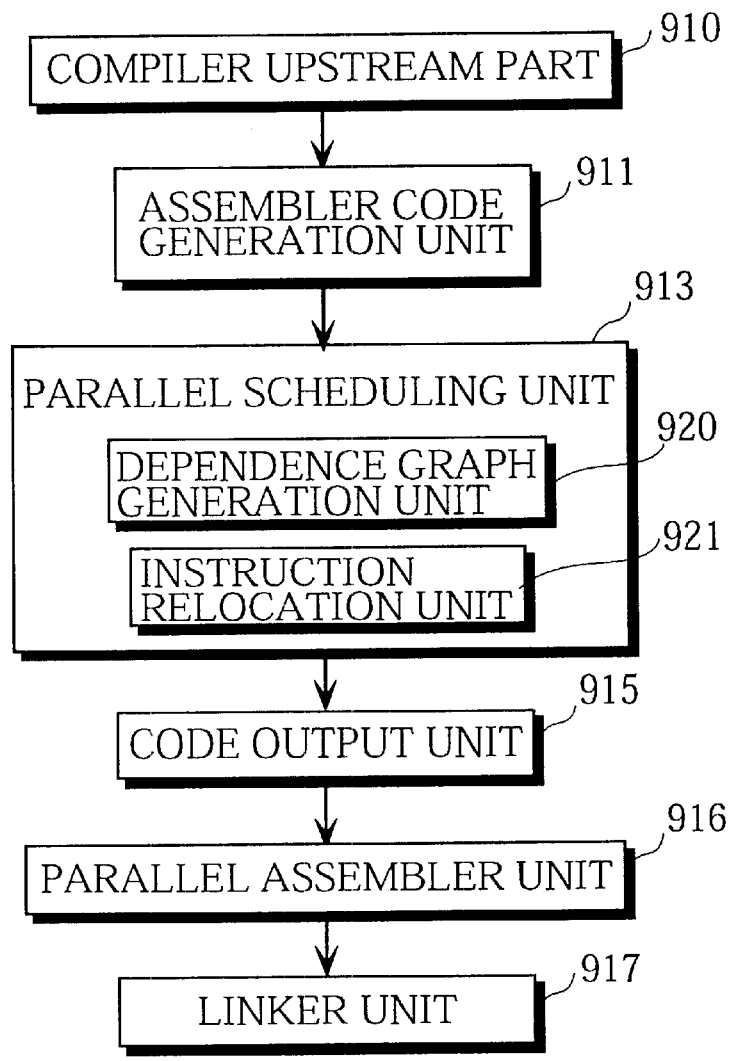
FIG. 13 is a block diagram showing the construction of an ordinary compiler.

FIG. 13 is a block diagram showing the construction of the ordinary compiler.

While the basic functions of the ordinary compiler are the same as those of the compiler of the embodiment, the ordinary compiler does not have the functions equivalent to the constant division unit 12 and the constant combination unit 14. Therefore, the ordinary compiler does not have the functions equivalent to the other elements 910–917, 920, and 921.

Therefore, when the assembler code generation unit 911 generates the serial assembler code shown in FIG. 11A, for instance, the serial assembler code is input into the parallel scheduling unit 913 as it is. As a result, the dependence graph generation unit 920 generates the dependence graph 925 shown in FIG. 14.

Figure 14:
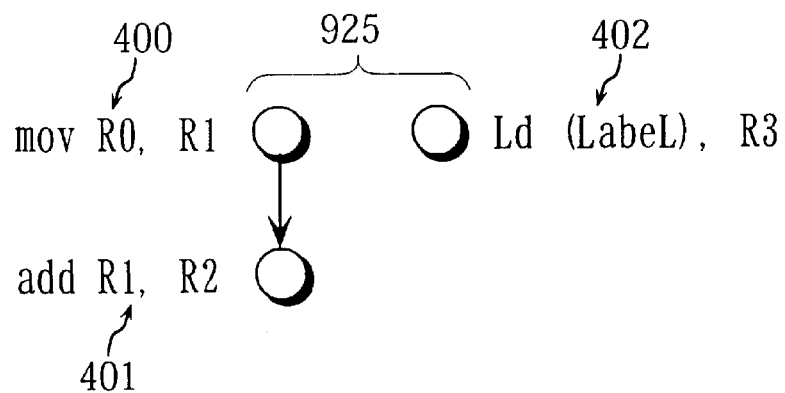
FIG. 14 shows a dependence graph generated by the dependence graph generation unit 920 of the ordinary compiler.

The instruction relocation unit 921 relocates the instructions shown in FIG. 11A according to the dependence graph 925. As shown in FIG. 14, the instructions 400 and 401 depend on each other and so cannot coexist (cannot construct a VLIW). The instruction 402 is 24 bits long so that the instruction 402 cannot coexist with other instructions 400 and 401. Therefore, the instruction relocation unit 921 generates three VLIWs 930–932 shown in FIG. 15.

As can be seen by comparing FIGS. 15 and 11C, the code size of the parallel assembler code generated by the ordinary compiler is greater than that of the embodiment by one VLIW. Therefore, one more cycle is required for the execution of the code generated by the ordinary compiler.

This is because the compiler of the embodiment divides the VLIW 932 in FIG. 15 into small instructions (one or more divided constant set instructions and a divided constant use instruction) and the small instructions are arranged into the VLIWs 930 and 931 to fill the redundant areas in these VLIWs.

<Example 2>

The following is a description of the operation of the linker unit 17 and the optimization process in the case where the serial assembler code 42 shown in FIG. 17A is generated by the assembler code generation unit 11 and is input into the constant division unit 12.

(Linker Unit 17)

FIGS. 17A–17G show a series of specific code and related information for the explanation of the operation of the linker unit 17.

FIG. 17A shows the serial assembler code 42 generated by the assembler code generation unit 11 of Example 2. FIG. 17B shows code generated by the constant division unit 12 to which the serial assembler code 42 is input. FIG. 17C shows parallel assembler code generated by the parallel scheduling unit 13 to which the generated code is input. FIGS. 17D and 17E show the object code 44a and relocation information 45a generated by the parallel assembler unit 16 to which the generated parallel assembler code is input. FIGS. 17F and 17G show the executable code 46 and the location information 40 generated by the linker unit 17 to which the object code 44a and the relocation information 45a are input.

Note that in this example, for the detailed explanation of the code generated by the assembler code generation unit 11, the constant division unit 12, and the parallel scheduling unit 13, FIGS. 17A–17C show additional information indicated by codes following the sign "@", where the additional information is generated together with each instruction. This additional information includes an identifier for specifying each instruction and information related to divided constants.

The additional information "@ID numeral" shown in FIG. 17A is the identifier of an instruction (an instruction identifier) in the same row. In FIG. 17B, the additional information "LbU12" and "LbL4" represent the upper 12 bits and the lower 4 bits of the label "LabeL", respectively, the additional information "S16" (the size information) indicates that the label "LabeL" having been divided with its size assumed to be 16 bits, and the additional information "M" indicates that the present instruction is the first one in the instructions to store divided pieces of the label "LabeL" into the constant buffer 107.

The instruction "DS" 414 shown in FIG. 17A is a dummy instruction for maintaining a storage area (4 bytes) for storing the label "LabeL".

The object code 44a shown in FIG. 17D and the relocation information 45a shown in FIG. 17E are input into the linker unit 17.

In FIG. 17D, the "location information" in the object code indicates relative addresses of each instruction by offsets (in byte units) from the start of a specific memory area (a segment or a section). The sign "0x" indicates that the number following the sign is expressed in hexadecimal. The signs "LabeL:12u" and "LabeL:4L" represent the upper 12 bits and the lower 4 bits of the label "LabeL", respectively, the two pieces being divided constants.

As shown in FIG. 17E, the relocation information 45a is composed of the "label", the "location information" indicating the location of an instruction referring to the label, and the "additional information" accompanying the instruction. Here, the location information is composed of an address of a VLIW and a numeral specifying the location of a unit operation field in the VLIW including an instruction referring to the label, where the VLIW address values differ from each other by 32 bits (4 bytes).

In this example, the label "LabeL" is referred to by an instruction arranged in the third operation field of the VLIW located at the relative address "0x1000" and this VLIW includes the additional information "ID102. LbU12. S16. M". The label "LabeL" is also referred to by the instruction arranged in the third operation field of the VLIW located at the relative address "0x1004" and this VLIW includes the additional information "ID102. LbL4. S16".

The following is a description of the operation of the linker unit 17 when receiving the object code 44a (shown in FIG. 17D) and the relocation information 45a (shown in FIG. 17E).

In this example, the label address calculation unit 22 calculates that the final size of the label "LabeL" is 28 bits by referring to other simultaneously input object code.

The instruction insertion unit 23 sets the label "LabeL" as the target label (step S61) and extracts relocation information of the target label "LabeL" from the relocation information 45a input into the linker unit 17 (step S62).

The instruction insertion unit 23 compares the size information "S16" included in the additional information of the relocation information with the size "28 bits" of the target label calculated by the label address calculation unit 22 (step S63).

In this case, the size calculated by the label address calculation unit 22 is greater than the size indicated by the size information. Therefore, the instruction insertion unit 23 specifies one out of the relocation information 429 and 430 for the label "LabeL" shown in FIG. 17E which includes the additional information "M" (in this example, the relocation information 429). Then the instruction insertion unit 23 inserts a new VLIW including a no-operation code (nop) and one or more divided constant set instructions immediately before the VLIW 425 corresponding to the location information (0x1000. 3) (step S64).

As shown in FIG. 17F, the resulting VLIW 431 is additionally inserted immediately before the VLIW 432. Note that in this VLIW 431, the label "LabeL:12u" indicates the upper 12 bits of the 28-bit label "LabeL", that is bits exceeding the 16 bits indicated by the size information of the relocation information. Also, in the VLIW 432, the divided constant "LabeL:12m" indicates middle 12 bits of the 28-bit label "LabeL".

In this manner, when the temporary label size which is assumed during compiling (the constant division by the constant division unit 12) is different from the final label size, an instruction is inserted to correct the difference.

Finally, the output unit 24 generates the location information 40 including the label size determined by the label address calculation unit 22 and outputs the location information with the executable code 46 obtained after the instruction insertion unit 23 performs the instruction insertion process (FIG. 17F).

The location information 436 of the label "LabeL" includes the label size "28" and the identifier "@ID102" of the instruction referring to the label. Here, when the optimization (described later) using this location information 40 is not performed, this output from the linker unit becomes the final executable code 46.

(Optimization Using Location Information 40)

The following is a description of the operation of the compiler when the location information 40 described above is fed back into the constant division unit 12 and the process by the following units is repeated.

FIGS. 18A–18E show code and related information generated by each component element when the generated location information 40 is fed back into the constant division unit 12.

FIG. 18A shows the code generated by the constant division unit 12 from the serial assembler code 42 shown in FIG. 17A and the location information 40 shown in FIG. 17G. FIG. 18B shows parallel assembler code generated by the parallel scheduling unit 13 from the generated code. FIGS. 18C and 18D respectively show the object code 44a and the relocation information 45a generated by the parallel assembler unit 16 from the parallel assembler code. FIG. 18E shows the executable code 46 generated by the linker unit 17 from the object code 44a and the relocation information 45a.

By referring to the input location information 40, the constant division unit 12 determines that the size of the external label of the instruction with the instruction identifier "ID102" is 28 bits (step S2 in FIG. 6), and divides the 28-bit label "LabeL" (steps S3 and S4). As a result, the instruction 412 in FIG. 17A is replaced by three instructions 442–444 shown in FIG. 18A. The additional information "LbM12" of the instruction 443 indicates that this instruction refers to the middle 12 bits of the label "LabeL".

The parallel scheduling unit 13 generates parallel assembler code without no-operation codes (nop) (see FIG. 18B) by generating a dependence graph and relocating instructions according to the procedure shown in FIGS. 7 and 8.

The parallel assembler unit 16 generates the object code 44a corresponding to the parallel assembler code (see FIG. 18C) and the relocation information 45a (see FIG. 18D). Note that the legend "LabeL.12m" shown in FIG. 18C represents the middle 12 bits of the label "LabeL".

In the linker unit 17, the label address calculation unit 22 calculates that the size of the label "LabeL" is 28 bits again and so the instruction insertion unit 23 does not insert any more instruction concerning the label "LabeL" (step S63 in FIG. 10). Therefore, the executable code 46 shown in FIG. 18E is generated.

As can be seen by comparing FIGS. 18E and 17F, the code size of the executable code optimized by sending back the location information 12 to the constant division unit 12 (see FIG. 18E) is smaller than that of the other executable code (see FIG. 17F) by one VLIW.

It should be noted that the executable code generated in this manner (see FIG. 18E) can be transported to target environments equipped with the VLIW processors 100 by means of a recording medium, such as a floppy disk, a CD-ROM, or a semiconductor memory, or through communications via a transmission medium.

<Example 3>

Figures 19A, 19B, 19C, 19D, 19E:
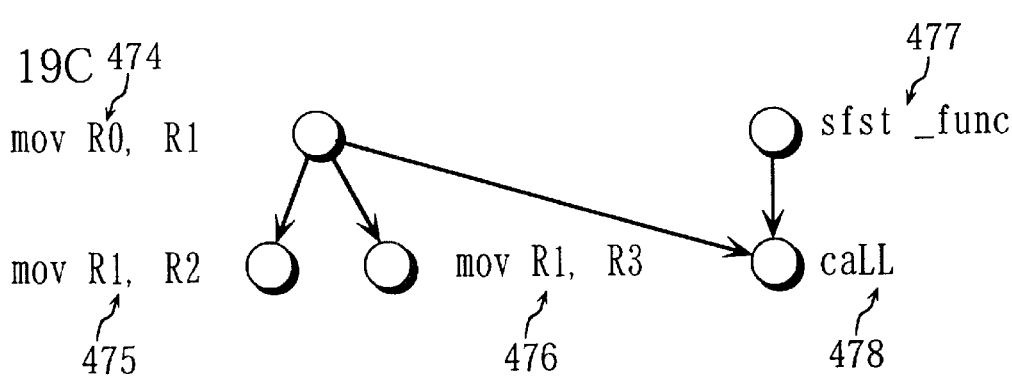
FIGS. 19A to 19E show a series of input and output code and related data of Example 3.

The following is a description of the operation of the constant division unit 12 and the parallel scheduling unit 13 in the case where serial assembler code 42 including a branch instruction shown in FIG. 19A is generated by the assembler code generation unit 11 and is input into the constant division unit 12.

FIG. 19A shows the serial assembler code 42 generated by the assembler code generation unit 11 of Example 3.

The branch instruction 473 in this figure is described below.
{(Instruction 473) caLL _func}

The execution control of the VLIW processor 100 moves to the branch label "_func".

In this example, the size of this branch label "_func" is 12 bits long and the argument R1 is transferred to the function "_func" when control branches to the function.

FIG. 19B shows the code generated by the constant division unit 12 from the serial assembler code 42 shown in FIG. 19A.

The branch instruction 473 is accompanied by the 12-bit branch label "_func" so that the instruction 473 is divided into the divided constant set instruction 477 for storing the branch label "_func" in the constant buffer 107 and the divided constant use instruction 478 equivalent to the operation code "caLL" of the branch instruction 473.

FIG. 19C shows a dependence graph generated by the dependence graph generation unit 20 in the case where the code shown in FIG. 19B is input.

Because the argument R1 is used in the function "_func", the branch instruction 478 depends on the instruction 474.

FIG. 19D shows the outputable instruction group and the output schedule instruction group temporarily generated by the instruction relocation unit 21 in the case where the code shown in FIG. 19B and the dependence graph shown in FIG. 19C are input.

In the second scheduling cycle, the branch instruction (caLL) 478 is included in the output schedule instruction group.

FIG. 19E shows the parallel assembler code generated by the instruction relocation unit 21. This figure also shows the code in the first field 51 of VLIWS.

In this manner, the constant division unit 12 and the parallel scheduling unit 13 of the present compiler generate the parallel assembler code of two VLIWs shown in FIG. 19E from the serial assembler code 42 shown in FIG. 19A.

The following is a description of the case where the same serial assembler code 42 is input into an ordinary compiler.

FIG. 16 shows parallel assembler code which may be generated by the ordinary compiler.

The ordinary compiler cannot divide the branch instruction 473 shown in FIG. 19A so that at least a 13-bit field, namely successive two fields, is required for this instruction. Therefore, parallel assembler code for three VLIWs 940–942 is generated and there are many redundant areas in these VLIWs.

<Example 4>

The following description centers on the operation of the constant combination unit 14 in the case where the serial assembler code 42 shown in FIG. 20A is generated by the assembler code generation unit 11 and is input into the constant division unit 12.

FIG. 20A shows the serial assembler code 42 generated by the assembler code generation unit 11 of Example 4.

Note that, in this example, while the size of the branch label "_func" used by the branch instruction 803 is 12 bits as in Example 3, no argument is transferred to the function "_func" when control branches to the function.

FIG. 20B shows the code generated by the constant division unit 12 from the serial assembler code 42 shown in FIG. 20A.

The branch instruction 503 is divided into the divided constant set instruction 507 and the divided constant use instruction 508 like the Example 3.

FIG. 20C shows a dependence graph generated by the dependence graph generation unit 20 from the code shown in FIG. 20B.

FIG. 20D shows the outputable instruction group and the output schedule instruction group temporarily generated by the instruction relocation unit 21 from the code shown in FIG. 20B and the dependence graph shown in FIG. 20C.

Unlike Example 3, in the second scheduling cycle, the divided constant set instruction 507 and the divided constant use instruction 508 are included in the output schedule instruction group.

FIG. 20E shows the parallel assembler code generated by the instruction relocation unit 21.

The parallel assembler code is composed of two VLIWs 509 and 510. The instructions 507 and 508 generated from the branch instruction 503 are arranged in the first field 51 and the second field 52 of the VLIW 510, respectively.

FIG. 20F shows the code generated by the constant combination unit 14 from the parallel assembler code shown in FIG. 20E.

The constant combination unit 14 detects that the divided constant set instruction 507 and the divided constant use instruction 508 generated from the same long constant use instruction (the branch instruction 503) are arranged in the same VLIW 510. Accordingly, the constant combination unit 14 replaces these instructions 507 and 508 with a long constant use instruction (an instruction of the same format as the original branch instruction 503) obtained by combining the instructions 507 and 508. This solves problems caused by the constant division unit 12 unnecessarily dividing a constant (since divided constants need not have arranged the divided constants in a plurality of VLIWs).

The target processor of the compiler of the embodiment is similar to the VLIW processor disclosed by Japanese Laid-Open Patent Application H9-159058 or H9-159059. The present compiler may be used for any constant reconstruction processor executing a program which is made by dividing instructions into parts and arranging the divided instructions parts in a plurality of VLIWs.

While the compiler of the embodiment generates VLIWs in two formats shown in FIGS. 2A and 2B, this compiler may generates VLIWs in any type of format, such as VLIWs which each are composed of three 16-bit operation fields. This is because the present invention is a technique for dividing constants included in instructions and performing parallel scheduling according to the size of operation fields of VLIWs.

The VLIW processor 100, which is the target processor of the compiler of the embodiment, includes a 32-bit shift register (the constant buffer 107). The shift register is filled with 0s immediately after a value stored in the shift register is referred to. However, the present invention is not limited to the processor including the constant buffer 107 functioning like this. The present invention may be used for a processor including a constant buffer for storing two or more independent constants and using instructions that explicitly indicate storage areas of the constants and clears the used content. More specifically, when a divided constant set instruction is generated, an instruction for indicating the storage area may also be generated. And when a divided constant use instruction is generated, an instruction for clearing the content may also be generated.

In the embodiment, fixed values such as 4 bits or 12 bits are used when constants are divided. However, the present invention is not limited to these values.

In the embodiment, when the size of a label cannot be determined, the size is assumed to be the most common address size (16 bits). However, the size may be assumed to be the maximum address size of the target processor. Also, when a constant whose size cannot be determined is an operand for a transfer/arithmetic logic instruction, the size of the constant may be assumed to be the maximum constant size of the target processor or to be the most common constant size. The assumed size may be pre-stored as a default value or may be specified by a user as an option when the compiler is activated.

Figure 21A:
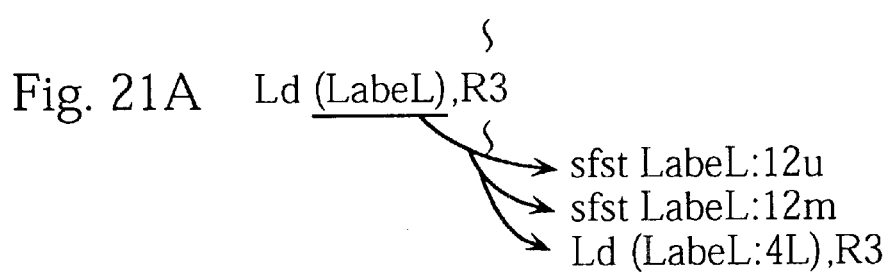
FIGS. 21A and 21B show that the function of the constant division unit 12 of the present invention can be expressed from two different points of view.
Figure 21B:
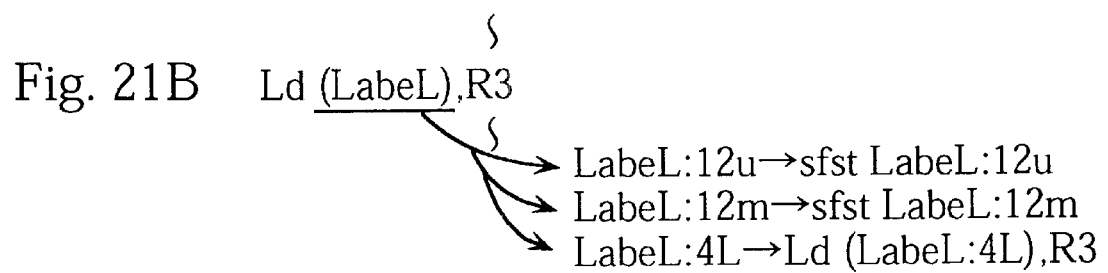

As can be understood from the specific description for step S4 in FIG. 6, the function of the constant division unit 12 can be expressed from two points of view. That is, from the first point of view, the constant division unit 12 functions as a means for dividing each instruction including a constant among input instructions (each long constant use instruction) into a plurality of instructions (one or more divided constant set instructions and a divided constant use instruction) as shown in FIG. 21A. From the second point of view, the constant division unit 12 functions as a means for dividing each constant in input instructions (each 28-bit long constant) into a plurality of parts and for generating a plurality of instructions respectively including the divided constant parts (a divided constant set instruction for the upper 12-bit divided constant, a divided constant set instruction for the middle 12-bit divided constant, and a divided constant use instruction including the lower 4-bit short constant) according to the input instructions, as shown in FIG. 21B.

In Example 1, the instruction relocation unit 21 adds the instruction 404 to the instruction 406 remaining in the outputable instruction group in the first scheduling cycle to proceed to the second cycle. However, the instruction relocation unit 21 may clear the content of the outputable instruction group and recalculate for each cycle.

It should be noted here that executable code generated by the compiler of the embodiment can be transported to a target environment which executes the generated code by means of a recording medium, such as a floppy disk, a CD-ROM, or a semiconductor memory, or through communications via a transmission medium.

Figure 22:
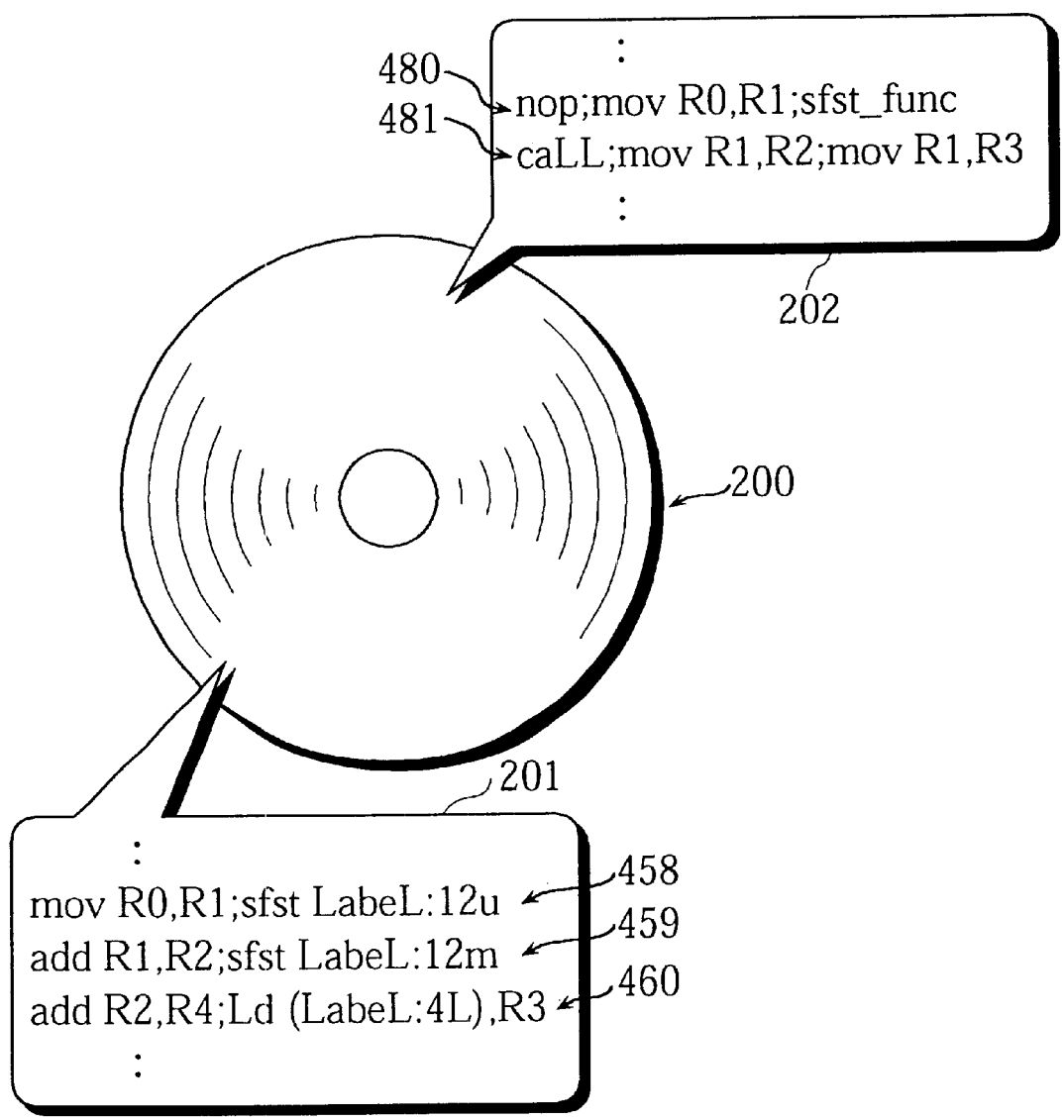
FIG. 22 shows a simplified content of a CD-ROM recording a VLIW sequence generated by the compiler of the present invention.

FIG. 22 shows a simplified content of the CD-ROM 200 recording the VLIW sequence 201 shown in FIG. 18E and the VLIW sequence 202 shown in FIG. 9E generated by the compiler of the embodiment. In the VLIW sequence 201, the two VLIWs 458 and 459 include constants to be combined and stored in the storage buffer of the processor implicitly indicated by the VLIW sequence. The VLIW 460 follows both the VLIWs 458 and 459 and is the first VLIW to refer to the storage buffer. This VLIW 460 includes a constant and the instruction (Ld) for using a constant obtained by combining the constant and the constants included in the two or more VLIWs. In the VLIW sequence 202, the VLIW 480 includes the constant (sfst) to be stored into the storage buffer of the processor implicitly indicated by the VLIW sequence. The VLIW 481, which follows the VLIW 480 and is the first VLIW to refer to the storage buffer, includes the instruction (caLL) for using the constant (_func) stored in the storage buffer.

The compiler itself of the present invention may also be stored in a recording medium, such as a floppy disk, a CD-ROM, or a semiconductor memory, and be distributed, like executable code obtained by the compiler.

What is claimed is:

1. A recording medium having a recorded compiler program which, during a compilation process, on a general purpose computer, converts a source program comprising an instruction sequence composed of serially arranged instructions into a VLIW (Very Long Instruction Word) sequence for use in a target VLIW processor, the recorded compiler program comprising:

a division step for dividing each instruction including a constant in the instruction sequence into a plurality of divided instructions before generating each VLIW;

an analysis step for analyzing dependence relations between each instruction in the instruction sequence including divided instructions generated in the division step according to an execution order of each instruction in the instruction sequence; and a relocation step for relocating instructions in the instruction sequence in compliance with the analyzed dependence relations and generating VLIWs which are each composed of a plurality of instructions that are executable in parallel.

2. The recording medium of claim 1,
wherein the division step includes:
- an instruction size judgement substep for performing an instruction size judgement as to whether a size of an instruction including a constant is equal to or smaller than a size of each unit operation field in a VLIW; and
- a division substep which, when the size of the instruction including the constant is judged to be greater than the size of each unit operation field, divides the instruction including the constant into a plurality of divided instructions whose sizes are each equal to or smaller than the size of each unit operation field.

3. The recording medium of claim 2,
wherein in the division substep, the instruction including the constant is divided into one or more instructions for storing the constant into a storage buffer of the VLIW processor and an instruction for using the stored constant.

4. The recording medium of claim 3,
wherein the recorded compiler program further comprises a combination step which, when two or more divided instructions generated from a same instruction including a constant in the division substep are arranged in a same VLIW in the relocation step, combines the two or more divided instructions into one instruction.

5. The recording medium of claim 4,
wherein in the instruction size judgement substep, the instruction size judgement is performed using an assumed size for the constant, and
the recorded compiler program further comprises:
- a constant size determination step for linking a plurality of VLIW sequences and determining a final size of each constant; and
- an insertion step which, when the final size is greater than the assumed size, generates an instruction for storing into the storage buffer a divided constant corresponding to a difference between the final size and the assumed size and inserting the generated instruction into a corresponding VLIW sequence.

6. The recording medium of claim 5,
wherein in the instruction size judgment substep, the assumed size is set to a maximum constant size manageable by the target VLIW processor.

7. The recording medium of claim 6,
wherein the recorded compiler program further comprises a step for re-executing the division step after the constant size determination step,
wherein in the instruction size judgement substep in the re-executed division step, the instruction size judgement is performed in consideration of the final size determined in the constant size determination step.

8. The recording medium of claim 7,
wherein the recorded compiler program further comprises a step for re-executing the analysis step and the relocation step following the re-executed division step.

9. The recording medium of claim 5,
wherein in the instruction size judgement substep, the assumed size of the constant is set to a most commonly used constant size.

10. The recording medium of claim 5,
wherein the recorded compiler program further comprises a step for re-executing the division step after the constant size determination step,
wherein in the instruction size judgement substep in the re-executed division step, the instruction size judgement is performed in consideration of the final size determined in the constant size determination step.

11. The recording medium of claim 2,
wherein in the division substep, the instruction including the constant is divided into one or more instructions for respectively storing one or more divided constants into a storage buffer of the VLIW processor and an instruction for using the stored divided constants, wherein the divided constants are obtained by dividing the constant.

12. The recording medium of claim 11,
wherein the recorded compiler program further comprises a combination step which, when two or more divided instructions generated from a same instruction including a constant in the division substep are arranged in a same VLIW in the relocation step, combines the two or more divided instructions into one instruction.

13. The recording medium of claim 12,
wherein in the instruction size judgement substep, the instruction size judgement is performed using an assumed size for the constant, and
the recorded compiler program further comprises:
- a constant size determination step for linking a plurality of VLIW sequences and determining a final size of each constant; and
- an insertion step which, when the final size is greater than the assumed size, generates an instruction for storing into the storage buffer a divided constant corresponding to a difference between the final size and the assumed size and inserting the generated instruction into a corresponding VLIW sequence.

14. The recording medium of claim 13,
wherein in the instruction size judgement substep, the assumed size is set to a maximum constant size manageable by the VLIW processor.

15. The recording medium of claim 14,
wherein the recorded compiler program further comprises a step for re-executing the division step after the constant size determination step,
wherein in the instruction size judgement substep in the re-executed division step, the instruction size judgement is performed in consideration of the final size determined in the constant size determination step.

16. The recording medium of claim 15,
wherein the recorded compiler program further comprises a step for re-executing the analysis step and the relocation step following the re-executed division step.

17. The recording medium of claim 13,
wherein in the instruction size judgement substep, the assumed size of the constant is set to a most commonly used constant size.

18. The recording medium of claim 13,
wherein the recorded compiler program further comprises a step for re-executing the division step after the constant size determination step,
wherein in the instruction size judgement substep in the re-executed division step, the instruction size judgement is performed in consideration of the final size determined in the constant size determination step.

19. A recording medium having a recorded compiler program for use on a general purpose computer, during the compilation, to translate and link a source program into an executable program for use on a target VLIW processor, the compiler program comprising:
- a first group compiler program instructions responsive to a series of high level language instructions for performing analysis on the source program and providing a series of assembler code instructions characterized to optimize the performance of the source program on a general purpose computer, a portion of the assembler code instructions in the series produced being serially arranged instructions having constants, and a second compiler program for performing:

a division step for dividing each constant in the instruction sequence into a plurality of divided constants and generating a plurality of instructions of which each include one of the plurality of divided constants before generating each VLIW;

an analysis step for analyzing dependence relations between each instruction in the instruction sequence including the generated plurality of instructions according to an execution order of each instruction in the instruction sequence; and a relocation step for relocating instructions in the instruction sequence in compliance with the analyzed dependence relations and generating VLIWs which are each composed of a plurality of instructions that are executable in parallel.

20. The recording medium of claim 19,
wherein the division step includes:
an instruction size judgement substep for performing an instruction size judgement as to whether a size of the constant is equal to or smaller than a size of each unit operation field in a VLIW; and
a division substep which, when the size of the constant is judged to be greater than the size of each unit operation field, divides the constant into a plurality of divided constants whose sizes are equal to or smaller than the size of each unit operation field.

21. The recording medium of claim 20,
wherein in the division step, an instruction for storing a divided constant obtained in the division substep into a storage buffer of the VLIW processor and an instruction for using the stored divided constant are generated.

22. The recording medium of claim 21,
wherein the recorded compiler program further comprises a combination step which, when two or more instructions generated in the division step are arranged in a same VLIW in the relocation step, combines the two or more instructions.

23. The recording medium of claim 22,
wherein in the instruction size judgement substep, the instruction size judgement is performed using an assumed size for the constant, and
the recorded compiler program further comprises:
a constant size determination step for linking a plurality of VLIW sequences and determining a final size of the constant; and
an insertion step which, when the final size is greater than the assumed size, generates an instruction for storing into the storage buffer a divided constant corresponding to a difference between the final size and the assumed size and inserting the generated instruction into a corresponding VLIW sequence.

24. The recording medium of claim 23,
wherein in the instruction size judgement substep, when the final size has not been determined, the assumed size is set to a maximum constant size manageable by the VLIW processor.

25. The recording medium of claim 24,
wherein the recorded compiler program further comprises a step for re-executing the division step after the constant size determination step, wherein in the instruction size judgement substep in the re-executed division step, the instruction size judgement is performed in consideration of the final size determined in the constant size determination step.

26. The recording medium of claim 25,
wherein the recorded compiler program further comprises a step for re-executing the analysis step and the relocation step following the re-executed division step.

27. The recording medium of claim 23,
wherein in the instruction size judgement substep, when the final size has not been determined, the assumed size of the constant is set to be a most commonly used constant size.

28. The recording medium of claim 23,
wherein the recorded compiler program further comprises a step for re-executing the division step after the constant size determination step,
wherein in the instruction size judgement substep in the re-executed division step, the instruction size judgement is performed in consideration of the final size determined in the constant size determination step.

29. A recording medium recording a VLIW sequence for a processor which executes a plurality of instructions in parallel, the VLIW sequence making the processor execute the steps of:
storing a constant included in a first VLIW in the VLIW sequence into an implicitly indicated storage buffer of the processor; and
using the constant stored in the storage buffer, based on an instruction in a second VLIW which follows the first VLIW, the instruction in the second VLIW being a first to refer to the storage buffer after the first VLIW.

30. The recording medium of claim 29,
wherein the constant included in the first VLIW is a branch address, and
the instruction included in the second VLIW is a branch instruction that does not include a branch address.

31. A recording medium recording a VLIW sequence for a processor which executes a plurality of instructions in parallel, the VLIW sequence making the processor execute the steps of:
storing a constant included in a first VLIW in the VLIW sequence into an implicitly indicated storage buffer of the processor; and
using a constant obtained by combining the constant stored in the storage buffer and a constant included in an instruction in a second VLIW which follows the first VLIW, based on the instruction in the second VLIW, the instruction in the second VLIW being a first to refer to the storage buffer after the first VLIW.

32. A recording medium recording a VLIW sequence for a processor which executes a plurality of instructions in parallel, the VLIW sequence making the processor execute the steps of:
combining constants respectively included in two or more first VLIWs in the VLIW sequence and storing the combined constants into an implicitly indicated storage buffer of the processor; and
using the combined constants stored in the storage buffer, based on an instruction in a second VLIW which follows the first VLIWs, the instruction in the second VLIW being a first to refer to the storage buffer after the first VLIWs.

33. A recording medium recording a VLIW sequence for a processor which executes a plurality of instructions in parallel, the VLIW sequence making the processor execute the steps of:

combining constants respectively included in two or more first VLIWs in the VLIW sequence and storing the combined constants into an implicitly indicated storage buffer of the processor; and using a constant obtained by combining the combined constants stored in the storage buffer and a constant included in an instruction in a second VLIW which follows the first VLIWs, based on the instruction in the second VLIW, the instruction in the second VLIW being a first to refer to the storage buffer after the first VLIWs.

34. An apparatus for converting, during compilation, an instruction sequence composed of serially arranged general purpose computer assembly language type instructions into a VLIW sequence for a predefined VLIW processor, the apparatus comprising:

a division means for dividing each instruction including a constant in the instruction sequence into a plurality of divided instructions before generating each VLIW;

an analysis means for analyzing dependence relations between each instruction in the instruction sequence including divided instructions generated in the division step according to an execution order of each instruction in the instruction sequence; and a relocation means for relocating instructions in the instruction sequence in compliance with the analyzed dependence relations and generating VLIWs which are each composed of a plurality of instructions that are executable in parallel.

35. An apparatus for converting, during compilation, an instruction sequence composed of serially arranged instructions into a VLIW sequence for a VLIW processor, the apparatus comprising:

a division means for dividing each constant in the instruction sequence into a plurality of divided constants and generating a plurality of instructions which each include one of the plurality of divided constants before generating each VLIW;

an analysis means for analyzing dependence relations between each instruction in the instruction sequence including the generated plurality of instructions according to an execution order of each instruction in the instruction sequence; and a relocation means for relocating instructions in the instruction sequence in compliance with the analyzed dependence relations and generating VLIWs which are each composed of a plurality of instructions that are executable in parallel.

36. A method for converting, during compilation, an instruction sequence of serially arranged instructions into a VLIW (Very Long Instruction Word) sequence for a predefined VLIW processor, comprising the steps of:

dividing each instruction including a constant in the instruction sequence into a plurality of divided instructions before generating each VLIW;

analyzing the dependence relations between each instruction in the instruction sequence including the divided instructions according to an execution order of each instruction in the instruction sequence; and relocating the instructions in the instruction sequence including the divided instructions in compliance with the analyzed dependence relations and generating the VLIWS, wherein each VLIW is composed of a plurality of instructions that are executable in parallel.

37. An apparatus for converting, during compilation, an instruction sequence of serially arranged instructions into a VLIW (Very long Instruction Word) sequence for a VLIW processor, comprising:

a division unit for dividing each instruction including a constant in the instruction sequence into a plurality of divided instructions before generating each VLIW;

a dependence graph relocation unit for generating a dependence graph by analyzing the dependence relations between each instruction in the instruction sequence including the divided instructions according to an execution order of each instruction in the instruction sequence; and an instruction relocation unit for relocating the instructions in the instruction sequence including the divided instructions in compliance with the dependence graph and generating the VLIWS, wherein each VLIW is composed of a plurality of instructions that are executable in parallel.

38. The apparatus of claim 37, wherein the division unit divides the constant in the instruction including the constant into a plurality of divided constants which are included in the plurality of divided instructions.

* * * * *